United States Patent [19]
Kiribayashi et al.

[11] Patent Number: 5,904,723
[45] Date of Patent: May 18, 1999

[54] TRIGGERING DEVICE FOR SAFETY APPARATUS

[75] Inventors: Shinichi Kiribayashi, Anjo; Mitsuhiko Masegi, Aichi-ken, both of Japan

[73] Assignee: Nippondenso Co., Ltd., Kariya, Japan

[21] Appl. No.: 08/658,667

[22] Filed: Jun. 4, 1996

[30] Foreign Application Priority Data

Jun. 12, 1995 [JP] Japan ................................. 7-170220
Mar. 8, 1996 [JP] Japan ................................. 8-80845

[51] Int. Cl.$^6$ .................................................. B60R 21/32
[52] U.S. Cl. .......................... 701/45; 280/735; 340/436; 307/10.1
[58] Field of Search ................................. 701/45, 46, 47; 280/734, 735; 180/274, 282; 307/10.1; 340/436, 438, 667

[56] References Cited

U.S. PATENT DOCUMENTS

| | | | |
|---|---|---|---|
| 4,836,024 | 6/1989 | Woehrl et al. | 280/735 |
| 4,845,377 | 7/1989 | Swart | 307/10.1 |
| 4,980,573 | 12/1990 | White et al. | 307/10.1 |
| 5,083,276 | 1/1992 | Okano et al. | 280/735 |
| 5,107,245 | 4/1992 | Gesper et al. | 280/735 |
| 5,173,614 | 12/1992 | Woehrl et al. | 280/735 |
| 5,182,459 | 1/1993 | Okano et al. | 280/735 |
| 5,208,484 | 5/1993 | Okano et al. | 307/10.1 |
| 5,359,515 | 10/1994 | Weller et al. | 307/10.1 |
| 5,363,303 | 11/1994 | Kaneko et al. | 701/45 |
| 5,424,583 | 6/1995 | Spies et al. | 280/735 |
| 5,513,109 | 4/1996 | Fujishima | 701/45 |
| 5,737,224 | 4/1998 | Jeenicke et al. | 701/45 |
| 5,746,444 | 5/1998 | Foo et al. | 701/45 |

FOREIGN PATENT DOCUMENTS

| | | |
|---|---|---|
| 63-255154 | 10/1988 | Japan . |
| 3-135859 | 6/1991 | Japan . |
| 3-253440 | 11/1991 | Japan . |
| 4-506495 | 11/1992 | Japan . |
| 5-69791 | 3/1993 | Japan . |

*Primary Examiner*—Gary Chin
*Attorney, Agent, or Firm*—Pillsbury Madison & Sutro LLP

[57] ABSTRACT

A triggering device for a safety apparatus includes first and second deceleration detecting sensors located within first and second doors of a vehicle respectively or located at positions near the first and second doors respectively. Each of the first and second deceleration detecting sensors is operative for detecting a deceleration. A first signal processing section includes first and second signal processors for processing a detection signal of the first deceleration detecting sensor, and for implementing signal processing with two different processing levels respectively. A second signal processing section includes third and fourth signal processors for processing a detection signal of the second deceleration detecting sensor, and for implementing signal processing with two different processing levels respectively. A first safety device located at the first door is operative for protecting an occupant in the vehicle. A second safety device located at the second door is operative for protecting an occupant in the vehicle. First and second trigger components are operative for triggering the first and second safety devices respectively. One of the first and second trigger components is controlled to trigger one of the first and second safety devices on the basis of results of the signal processing by the first signal processor and the fourth signal processor. The other of the first and second trigger components is controlled to trigger the other of the first and second safety devices on the basis of results of the signal processing by the second signal processor and the third signal processor.

2 Claims, 21 Drawing Sheets

OUTPUT OF ACCELERATION SENSOR 11

INTEGRATION RESULT IN SUB SIGNAL PROCESSORS 13, 14

OUTPUT OF COMPARATOR IN SUB SIGNAL PROCESSOR 13

OUTPUT OF COMPARATOR IN SUB SIGNAL PROCESSOR 14

FIG. 7(a) OUTPUT OF ACCELERATION SENSOR 11
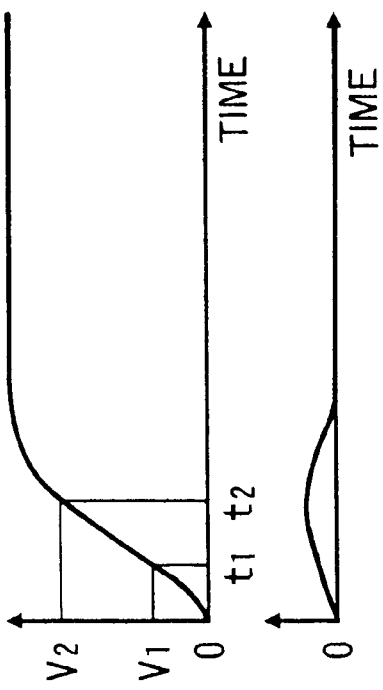
FIG. 7(b) RESULT OF INTEGRATION OF OUTPUT OF ACCELERATION SENSOR 11
FIG. 7(c) OUTPUT OF ACCELERATION SENSOR 21
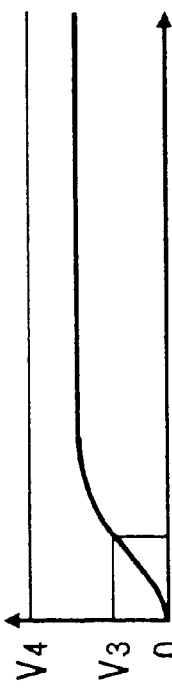
FIG. 7(d) RESULT OF INTEGRATION OF OUTPUT OF ACCELERATION SENSOR 21
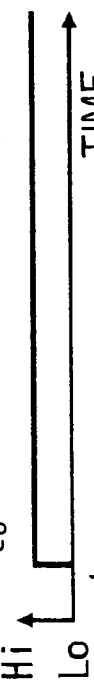
FIG. 7(e) OUTPUT OF SUB SIGNAL PROCESSOR 13
FIG. 7(f) OUTPUT OF SUB SIGNAL PROCESSOR 14
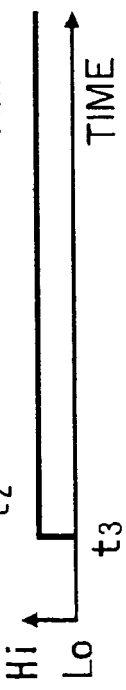
FIG. 7(g) OUTPUT OF SUB SIGNAL PROCESSOR 23

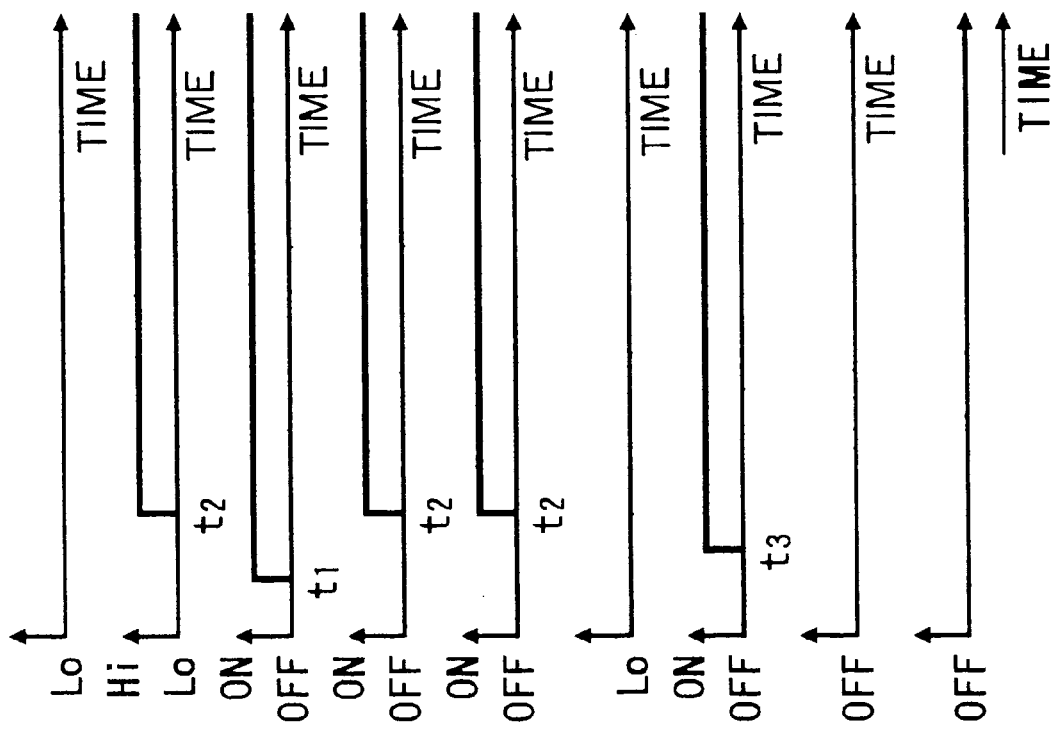

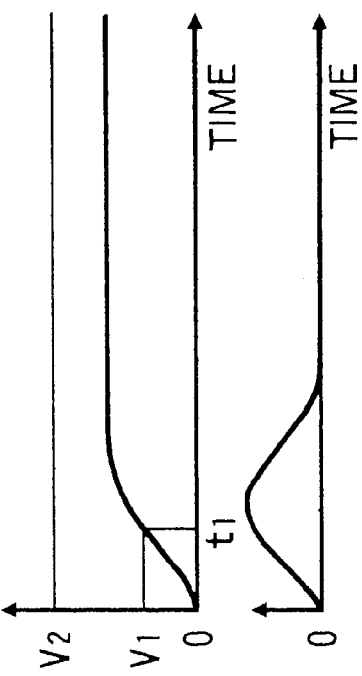
FIG. 9(a) OUTPUT OF ACCELERATION SENSOR 11
FIG. 9(b) RESULT OF INTEGRATION OF OUTPUT OF ACCELERATION SENSOR 11
FIG. 9(c) OUTPUT OF ACCELERATION SENSOR 21
FIG. 9(d) RESULT OF INTEGRATION OF OUTPUT OF ACCELERATION SENSOR 21
FIG. 9(e) OUTPUT OF SUB SIGNAL PROCESSOR 13
FIG. 9(f) OUTPUT OF SUB SIGNAL PROCESSOR 14
FIG. 9(g) OUTPUT OF SUB SIGNAL PROCESSOR 23

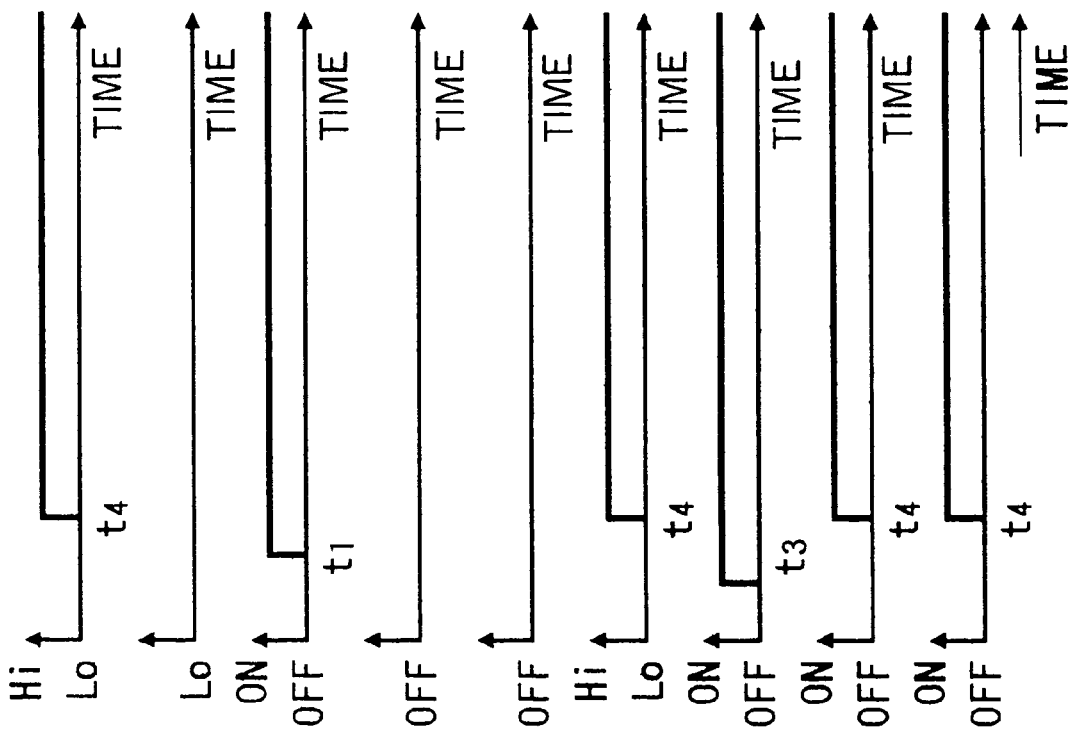

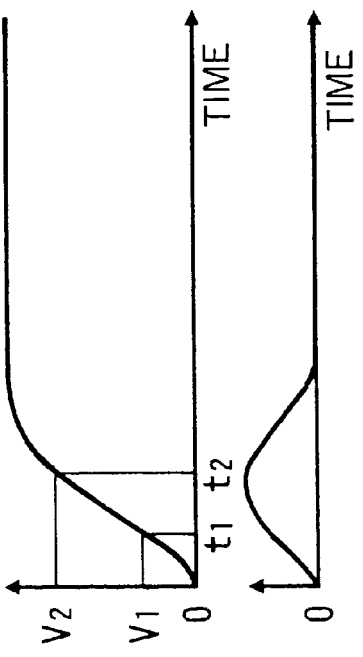
FIG. 12(a) OUTPUT OF ACCELERATION SENSOR 11
FIG. 12(b) RESULT OF INTEGRATION OF OUTPUT OF ACCELERATION SENSOR 11
FIG. 12(c) OUTPUT OF ACCELERATION SENSOR 21
FIG. 12(d) RESULT OF INTEGRATION OF OUTPUT OF ACCELERATION SENSOR 21
FIG. 12(e) OUTPUT OF SUB SIGNAL PROCESSOR 13
FIG. 12(f) OUTPUT OF SUB SIGNAL PROCESSOR 14
FIG. 12(g) OUTPUT OF SUB SIGNAL PROCESSOR 23

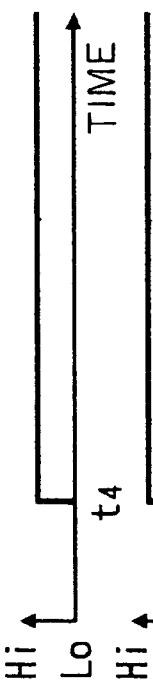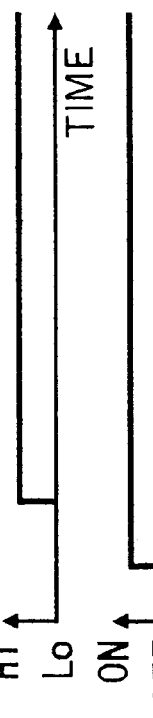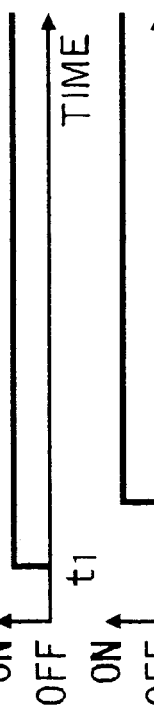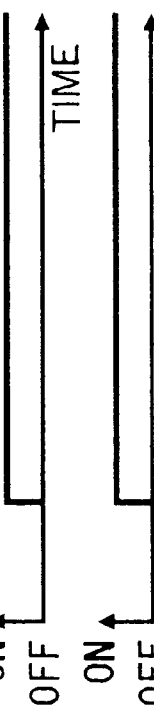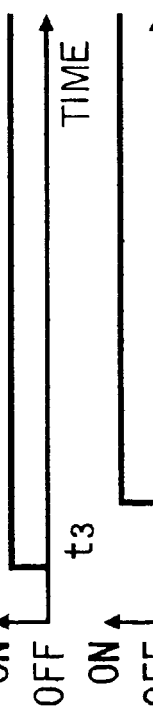
FIG. 12(h) OUTPUT OF SUB SIGNAL PROCESSOR 24
FIG. 12(i) OUTPUT OF AND CIRCUIT 15
FIG. 12(j) STATE OF SWITCH 16
FIG. 12(k) STATE OF SWITCH 17
FIG. 12(l) STATE OF FIRST TRIGGER COMPONENT 18
FIG. 12(m) OUTPUT OF AND CIRCUIT 25
FIG. 12(n) STATE OF SWITCH 26
FIG. 12(o) STATE OF SWITCH 27
FIG. 12(p) STATE OF SECOND TRIGGER COMPONENT 28

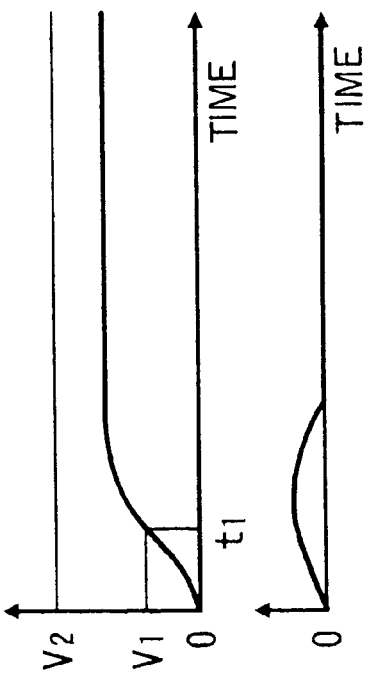
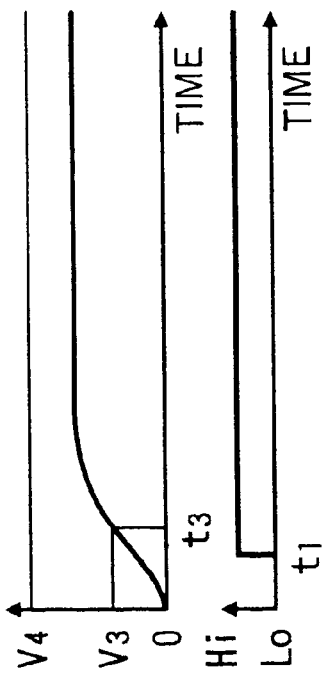
FIG. 14(a) OUTPUT OF ACCELERATION SENSOR 11
FIG. 14(b) RESULT OF INTEGRATION OF OUTPUT OF ACCELERATION SENSOR 11
FIG. 14(c) OUTPUT OF ACCELERATION SENSOR 21
FIG. 14(d) RESULT OF INTEGRATION OF OUTPUT OF ACCELERATION SENSOR 21
FIG. 14(e) OUTPUT OF SUB SIGNAL PROCESSOR 13
FIG. 14(f) OUTPUT OF SUB SIGNAL PROCESSOR 14
FIG. 14(g) OUTPUT OF SUB SIGNAL PROCESSOR 23

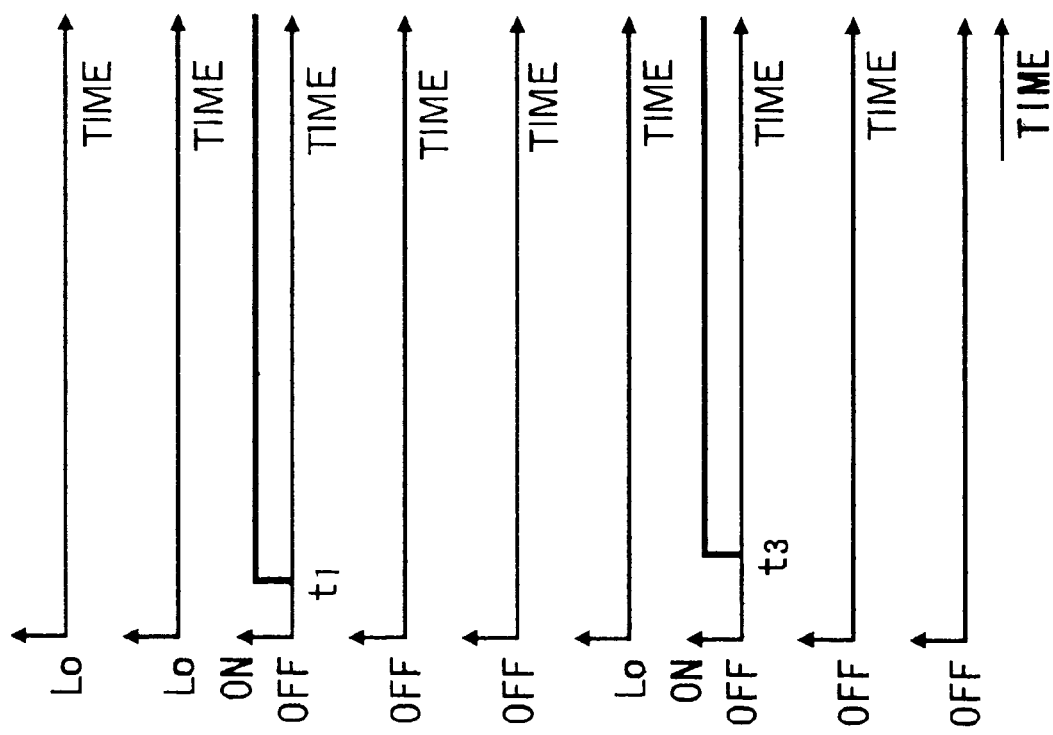

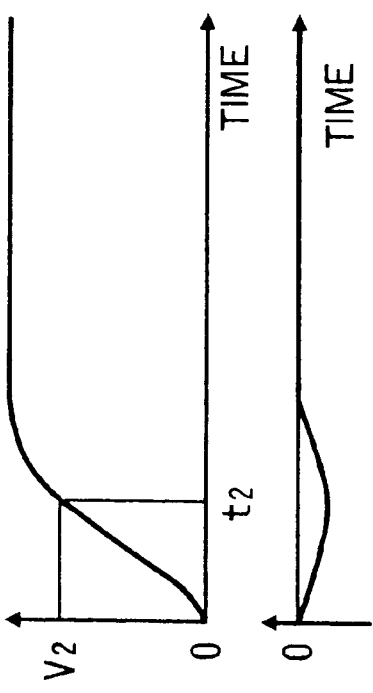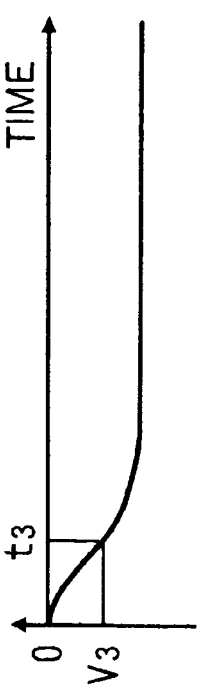
FIG. 17(a) OUTPUT OF ACCELERATION SENSOR 11
FIG. 17(b) RESULT OF INTEGRATION OF OUTPUT OF ACCELERATION SENSOR 11
FIG. 17(c) OUTPUT OF ACCELERATION SENSOR 21
FIG. 17(d) RESULT OF INTEGRATION OF OUTPUT OF ACCELERATION SENSOR 21
FIG. 17(e) OUTPUT OF SUB SIGNAL PROCESSOR 13

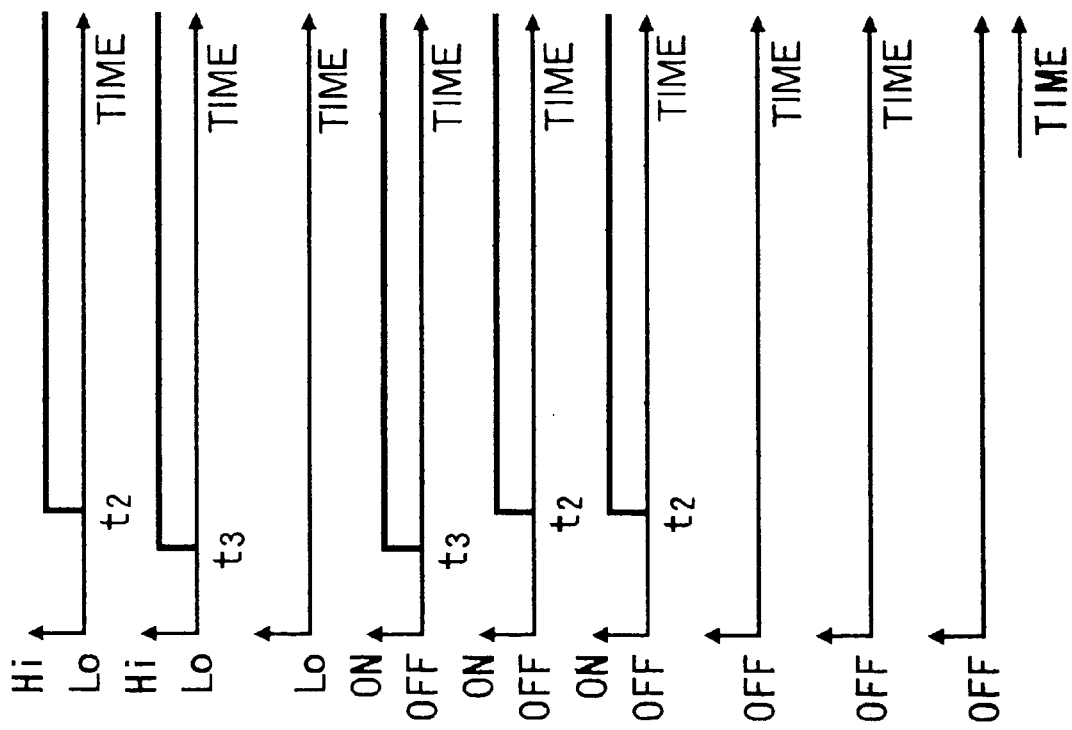

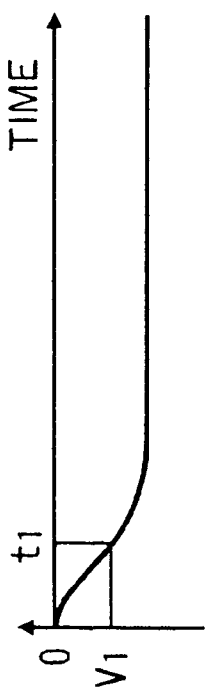
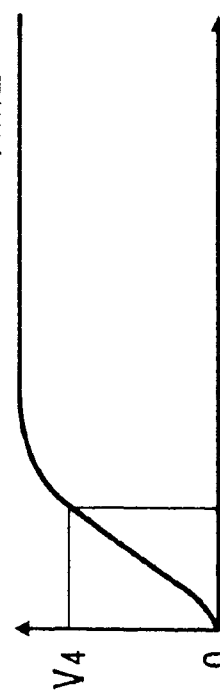
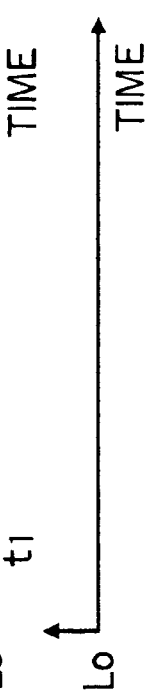
FIG.18(a) OUTPUT OF ACCELERATION SENSOR 11
FIG.18(b) RESULT OF INTEGRATION OF OUTPUT OF ACCELERATION SENSOR 11
FIG.18(c) OUTPUT OF ACCELERATION SENSOR 21
FIG.18(d) RESULT OF INTEGRATION OF OUTPUT OF ACCELERATION SENSOR 21
FIG.18(e) OUTPUT OF SUB SIGNAL PROCESSOR 13
FIG.18(f) OUTPUT OF SUB SIGNAL PROCESSOR 14

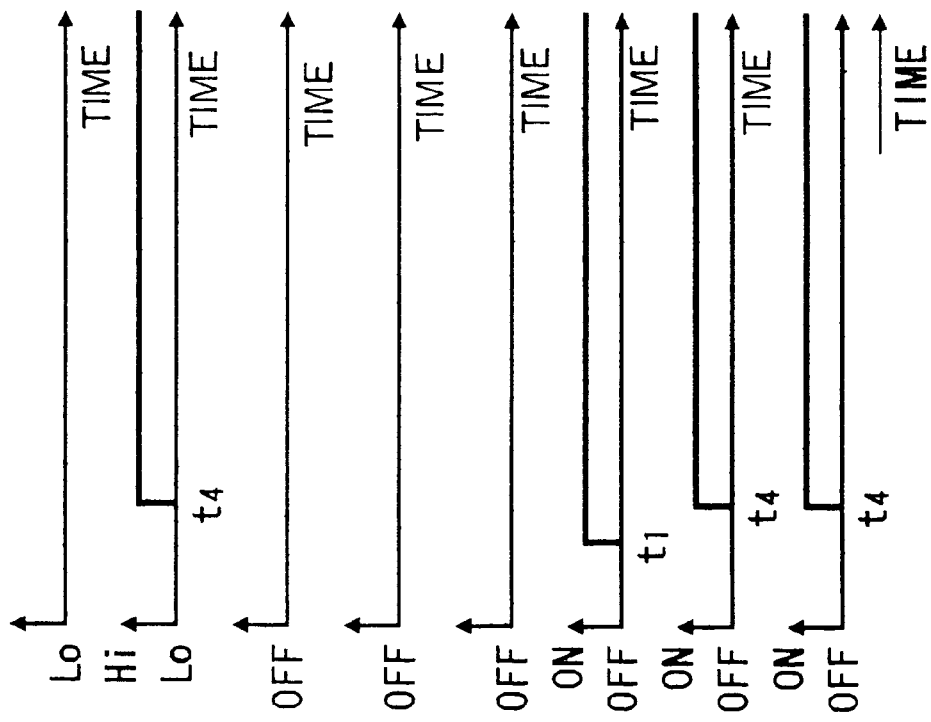

TRIGGERING DEVICE FOR SAFETY APPARATUS

BACKGROUND OF THE INVENTION

1. Field of the Invention

This invention relates to a triggering device for a vehicle occupant safety apparatus such as an air-bag apparatus or a vehicle safety-belt pretensioner (tightener).

2. Description of the Prior Art

U.S. Pat. No. 5,107,245 discloses a control arrangement for the occupant restraint system of an automotive vehicle which includes an acceleration pickup for sensing deceleration of the vehicle and providing an acceleration signal. A trip device is in the occupant restraint system. A microcomputer processes the acceleration signal. The microcomputer supplies one or more trip signals to the trip device when the result of processing of the acceleration signal fulfills a criterion for activation of the occupant restraint system. A monitoring circuit external to the microcomputer includes an associated stable oscillator providing a reference signal. The monitoring circuit serves to monitor, as to correct frequency by comparison with the reference signal, a check signal derived from a clock signal of the microcomputer. The monitoring circuit produces an enable signal when the check signal has the correct frequency. The monitoring circuit activates an indicating means when the check signal is found to be incorrect. The monitoring circuit prevents the supply of the trip signal to the trip device in response to the disappearance of the enable signal.

U.S. Pat. No. 5,359,515 corresponding to Japanese published PCT application 4-506495 discloses a vehicle occupant safety system which includes a sensor device having at least two sensors, and a processing device having at least two processing circuits for the respective sensor signals. The vehicle occupant safety system in U.S. Pat. No. 5,359,515 further includes a computing system and a trigger circuit each having at least two stages for a safety device. For providing a high degree of safety with relatively low costs, the computing system is constructed as a single-computer system in such a way that it processes the data of the two processing circuits in two programs with staggered timing with respect to one another.

Japanese published unexamined patent application 5-69791 discloses a side-crash sensing system for automotive side air-bag devices in which an air-bag trigger component is controlled in response to the output signals of plural acceleration sensors.

SUMMARY OF THE INVENTION

It is an object of this invention to provide an improved triggering device for a vehicle occupant safety apparatus.

A first aspect of this invention provides a triggering device for a safety apparatus which comprises first and second deceleration detecting means, located within first and second doors of a vehicle respectively or located at positions near the first and second doors respectively, each for detecting a deceleration; first signal processing means including first and second signal processors for processing a detection signal of the first deceleration detecting means, and for implementing signal processing with two different processing levels respectively; second signal processing means including third and fourth signal processors for processing a detection signal of the second deceleration detecting means, and for implementing signal processing with two different processing levels respectively; a first safety device located at the first door for protecting an occupant in the vehicle; a second safety device located at the second door for protecting an occupant in the vehicle; first and second triggering means for triggering the first and second safety devices respectively; means for controlling one of the first and second triggering means to trigger one of the first and second safety devices on the basis of results of the signal processing by the first signal processor in the first signal processing means and the fourth signal processor in the second signal processing means; and means for controlling the other of the first and second triggering means to trigger the other of the first and second safety devices on the basis of results of the signal processing by the second signal processor in the first signal processing means and the third signal processor in the second signal processing means.

A second aspect of this invention is based on the first aspect thereof, and provides a triggering device wherein the first and second deceleration detecting means are located within a right-hand door and a left-hand door respectively or located near the right-hand door and the left-hand door respectively.

A third aspect of this invention is based on the first aspect thereof, and provides a triggering device wherein the first and second deceleration detecting means are located within a front door and a rear door at a same side of the vehicle respectively or located near the front door and the rear door respectively.

A fourth aspect of this invention is based on the second aspect thereof, and provides a triggering device wherein the first deceleration detecting means outputs one of a positive signal and a negative signal in response to a shock from a right-hand side of the vehicle, and outputs the other of the positive signal and the negative signal in response to a shock from a left-hand side of the vehicle; the second deceleration detecting means outputs one of a positive signal and a negative signal in response to a shock from a left-hand side of the vehicle, and outputs the other of the positive signal and the negative signal in response to a shock from a right-hand side of the vehicle; the first signal processor in the first signal processing means processes one of the positive signal and the negative signal, and detects whether or not a result of the process reaches a given level; the second signal processor in the first signal processing means processes the other of the positive signal and the negative signal, and detects whether or not a result of the process reaches a given level; the third signal processor in the second signal processing means processes one of the positive signal and the negative signal, and detects whether or not a result of the process reaches a given level; and the fourth signal processor in the second signal processing means processes the other of the positive signal and the negative signal, and detects whether or not a result of the process reaches a given level.

A fifth aspect of this invention is based on the first aspect thereof, and provides a triggering device wherein the first signal processor in the first signal processing means processes the detection signal of the first deceleration detecting means, and detects whether or not a result of the process is smaller than a first given level; the second signal processor in the first signal processing means processes the detection signal of the first deceleration detecting means, and detects whether or not a result of the process is smaller than a second given level greater than the first given level; the third signal processor in the second signal processing means processes the detection signal of the second deceleration detecting means, and detects whether or not a result of the process is smaller than a third given level; and the fourth signal processor in the second signal processing means processes the detection signal of the second deceleration detecting means, and detects whether or not a result of the process is smaller than a fourth given level greater than the third given level.

A sixth aspect of this invention is based on the fifth aspect thereof, and provides a triggering device wherein the first triggering means triggers the first safety device on the basis of results of the signal processing by the first signal processor and the second signal processor in the first signal processing means and the fourth signal processor in the second signal processing means; and the second triggering means triggers the second safety device on the basis of results of the signal processing by the third signal processor and the fourth signal processor in the second signal processing means and the second signal processor in the first signal processing means.

A seventh aspect of this invention is based on the fifth aspect thereof, and provides a triggering device wherein the first triggering means triggers the first safety device on the basis of results of the signal processing by the first signal processor and the second signal processor in the first signal processing means and the third signal processor in the second signal processing means; and the second triggering means triggers the second safety device on the basis of results of the signal processing by the third signal processor and the fourth signal processor in the second signal processing means and the first signal processor in the first signal processing means.

An eighth aspect of this invention provides an apparatus comprising first and acceleration sensors located at different positions respectively; first means connected to the first acceleration sensor for integrating an output signal of the first acceleration sensor into a first integration-resultant signal; second means connected to the first means for comparing the first integration-resultant signal and a first fixed reference signal, and for generating and outputting a signal representing a result of said comparing; third means connected to the first means for comparing the first integration-resultant signal and a second fixed reference signal, and for generating and outputting a signal representing a result of said comparing, the second fixed reference signal differing from the first fixed reference signal; fourth means connected to the second acceleration sensor for integrating an output signal of the second acceleration sensor into a second integration-resultant signal; fifth means connected to the fourth means for comparing the second integration-resultant signal and a third fixed reference signal, and for generating and outputting a signal representing a result of said comparing; a trigger component; and sixth means connected to the second means, the third means, the fifth means, and the trigger component for controlling the trigger component in response to the output signal of the second means, the output signal of the third means, and the output signal of the fifth means.

A ninth aspect of this invention is based on the eighth aspect thereof, and provides an apparatus wherein the sixth means comprises seventh means for executing AND operation among the output signal of the second means, the output signal of the third means, and the output signal of the fifth means, and eighth means connected to the seventh means and the trigger component for controlling the trigger component in response to a result of the AND operation executed by the seventh means.

BRIEF DESCRIPTION OF THE DRAWINGS

FIG. 7 is a time-domain diagram of signals and conditions of components in the triggering device of FIG. 1.

FIG. 9 is a time-domain diagram of signals and conditions of components in the triggering device of FIG. 1.

FIG. 12 is a time-domain diagram of signals and conditions of components in the triggering device of FIG. 10.

FIG. 14 is a time-domain diagram of signals and conditions of components in the triggering device of FIG. 10.

FIG. 17 is a time-domain diagram of signals and conditions of components in the triggering device of FIG. 16.

FIG. 18 is a time-domain diagram of signals and conditions of components in the triggering device of FIG. 16.

DESCRIPTION OF THE PREFERRED EMBODIMENTS

First Embodiment

Figure 1:
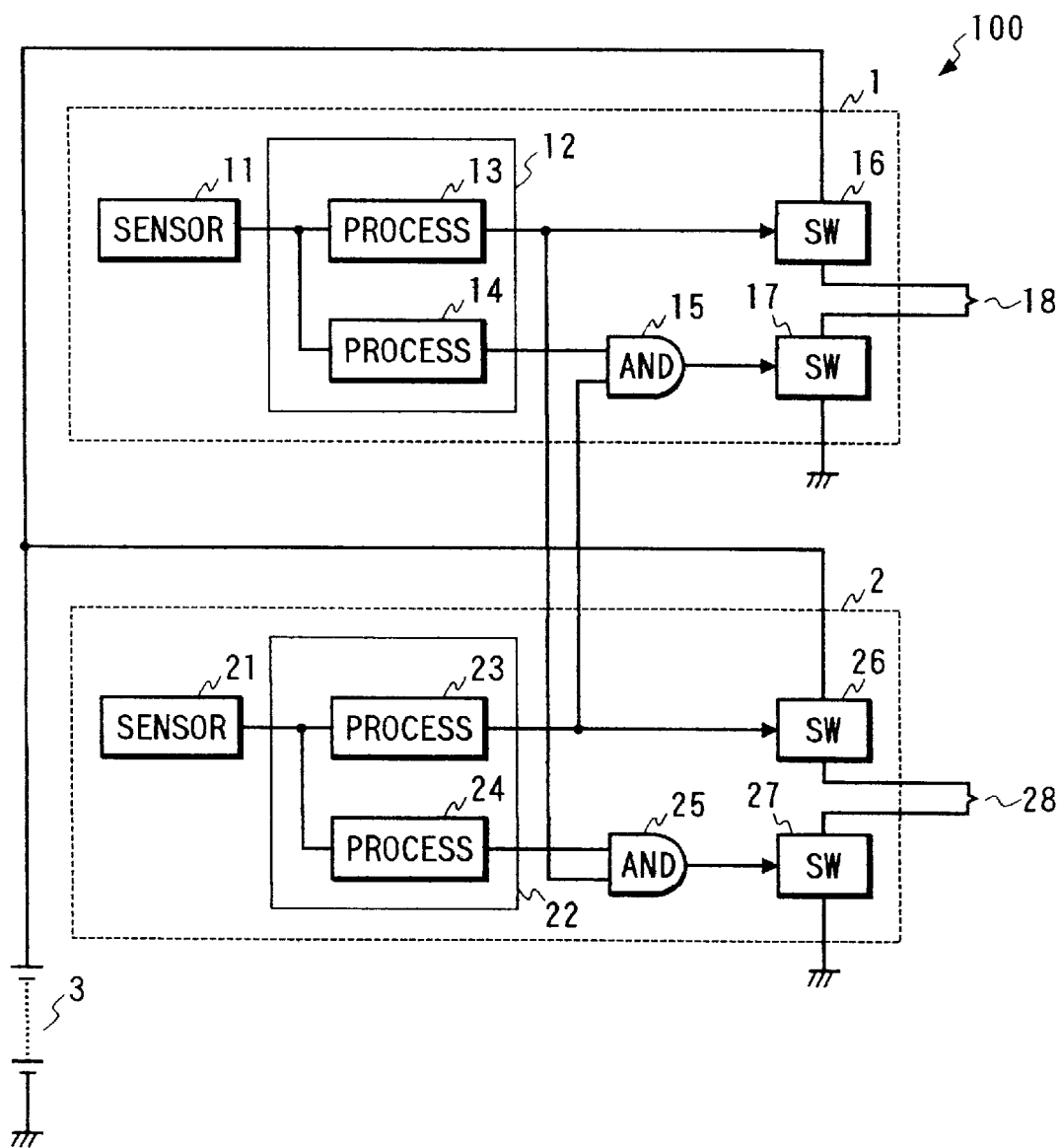
FIG. 1 is a block diagram of a triggering device according to a first embodiment of this invention.

With reference to FIG. 1, a triggering device 100 operates on air-bag devices (not shown) provided at right-hand and left-hand sides of an automotive vehicle respectively. The air-bag devices are located at, for example, right-hand and left-hand doors of the automotive vehicle respectively. The triggering device 100 activates at least one of the air-bag devices when a side of the automotive vehicle collides with an object.

The triggering device 100 includes a first main section 1, a second main section 2, a vehicle battery 3, a first trigger component 18, and a second trigger component 28. Each of the first and second main sections 1 and 2 detects the deceleration (or the acceleration) of the automotive vehicle, and generates a signal representing the detected deceleration. Each of the first and second main sections 1 and 2 processes the deceleration signal, and outputs a signal depending on the result of the processing of the deceleration signal. The first and second trigger components 18 and 28 follow the first and second main sections 1 and 2 respectively. The first and second trigger components 18 and 28 are of the electrically-powered type. The first and second trigger components 18 and 28 serve to activate the air-bag devices respectively. The first trigger component 18 is controlled by the output signal of the first main section 1. The second trigger component 28 is controlled by the output signal of the second main section 2. The vehicle battery 3 is connected to the first and second main sections 1 and 2. The vehicle battery 3 electrically powers the first and second main sections 1 and 2.

The first and second main sections 1 and 2 of the triggering device 100 are provided on regions of a vehicle body floor near the right-hand and left-hand doors respectively. The air-bag devices correspond to first and second safety devices respectively. The right-hand door and the left-hand door of the automotive vehicle correspond to first and second doors respectively.

The first main section 1 of the triggering device 100 includes an acceleration sensor 11, a signal processor 12, an AND circuit 15, and switches 16 and 17. The acceleration sensor 11 detects deceleration (or acceleration) of the body of the automotive vehicle, and outputs a detection signal representative thereof. The signal processor 12 follows the acceleration sensor 11. The signal processor 12 integrates and processes the detection signal outputted from the acceleration sensor 11. The switch 16 follows the signal processor 12. The AND circuit 15 follows the signal processor 12. The switch 17 follows the AND circuit 15. The switch 16, the first trigger component 18, and the switch 17 are connected in series with the vehicle battery 3. The first trigger component 18 is energized in response to the result of AND operation between the switches 16 and 17.

The second main section 2 of the triggering device 100 includes an acceleration sensor 21, a signal processor 22, an AND circuit 25, and switches 26 and 27. The acceleration sensor 21 detects deceleration (or acceleration) of the body of the automotive vehicle, and outputs a detection signal representative thereof. The signal processor 22 follows the acceleration sensor 21. The signal processor 22 integrates and processes the detection signal outputted from the acceleration sensor 21. The switch 26 follows the signal processor 22. The AND circuit 25 follows the signal processor 22. The switch 27 follows the AND circuit 25. The switch 26, the second trigger component 28, and the switch 27 are connected in series with the vehicle battery 3. The second trigger component 28 is energized in response to the result of AND operation between the switches 26 and 27.

The acceleration sensors 11 and 21 correspond to first and second deceleration detecting means respectively. The signal processors 12 and 22 correspond to first and second signal processing means respectively. The AND circuit 15, the switches 16 and 17, and the first trigger component 18 compose first triggering means. The AND circuit 25, the switches 26 and 27, and the second trigger component 28 compose second triggering means. The acceleration sensors 11 and 21 are disposed in inner spaces within the right-hand and left-hand doors respectively. Alternatively, the acceleration sensors 11 and 21 may be fixedly located at positions near the right-hand and left-hand doors respectively.

The signal processor 12 includes first and second sub signal processors 13 and 14 using different threshold values (corresponding to processing levels) for crash judgment or collision decision respectively. The first and second sub signal processors 13 and 14 correspond to first and second signal processors respectively. The first and second sub signal processors 13 and 14 receive the detection signal from the acceleration sensor 11. The first sub signal processor 13 is followed by the switch 16 and a first input terminal of the AND circuit 25. The second sub signal processor 14 is followed by a first input terminal of the AND circuit 15. Each of the first and second sub signal processors 13 and 14 includes a combination of an integrating circuit and a comparator. Each of the first and second sub signal processors 13 and 14 integrates the detection signal outputted from the acceleration sensor 11, and outputs a high-level signal when the resultant integration value reaches a given threshold value.

The signal processor 22 includes first and second sub signal processors 23 and 24 using different threshold values (corresponding to processing levels) for crash judgment or collision decision respectively. The first and second sub signal processors 23 and 24 correspond to third and fourth signal processors respectively. The first and second sub signal processors 23 and 24 receive the detection signal from the acceleration sensor 21. The first sub signal processor 23 is followed by the switch 26 and a second input terminal of the AND circuit 15. The second sub signal processor 24 is followed by a second input terminal of the AND circuit 25. Each of the first and second sub signal processors 23 and 24 includes a combination of an integrating circuit and a comparator. Each of the first and second sub signal processors 23 and 24 integrates the detection signal outputted from the acceleration sensor 21, and outputs a high-level signal when the resultant integration value reaches a given threshold value.

Figure 2:
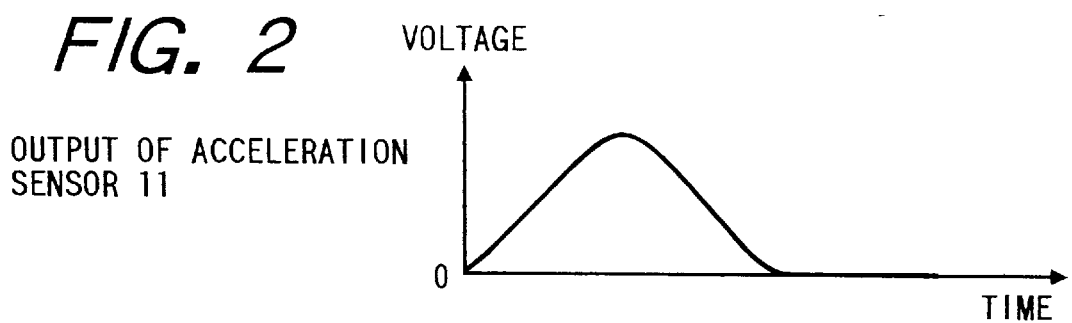
FIG. 2 is a time-domain diagram of the output signal of an acceleration sensor in the triggering device of FIG. 1.
Figure 3:
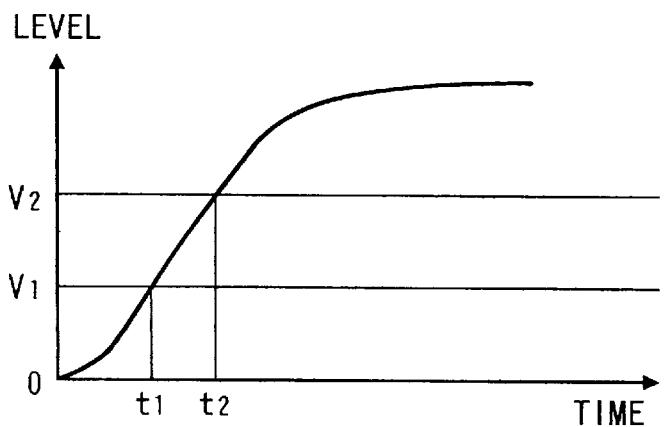
FIG. 3 is a time-domain diagram of the output signal of an integrating circuit in a first sub signal processor in the triggering device of FIG. 1.
Figure 4:
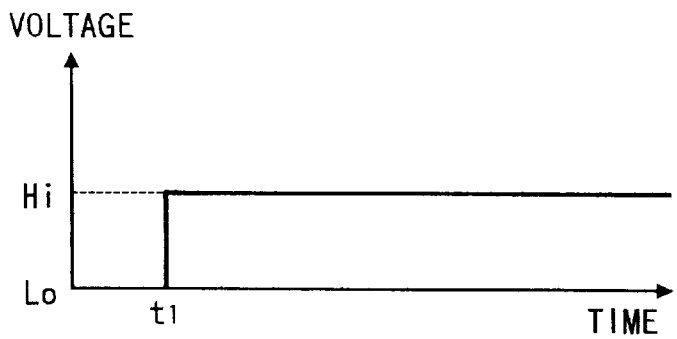
FIG. 4 is a time-domain diagram of the output signal of a comparator in the first sub signal processor in the triggering device of FIG. 1.
Figure 5:
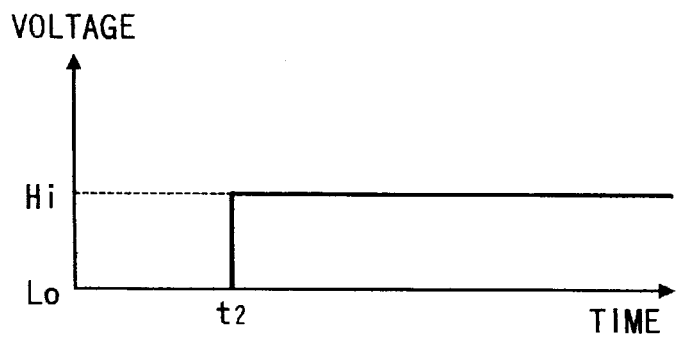
FIG. 5 is a time-domain diagram of the output signal of a comparator in a second sub signal processor in the triggering device of FIG. 1.

It is now assumed that the acceleration sensor 11 detects deceleration of the automotive vehicle, and the voltage of the output signal of the acceleration sensor 11 varies as shown in FIG. 2. As previously described, the integrating circuit in each of the first and second sub signal processors 13 and 14 integrates the output signal of the acceleration sensor 11. The integrating circuit in each of the first and second sub signal processors 13 and 14 generates an integration-resultant signal which varies as shown in FIG. 3. A given threshold value (a given threshold voltage) V1 used by the first sub signal processor 13 is smaller than a given threshold value (a given threshold voltage) V2 used by the second sub signal processor 14. With reference to FIG. 3, the integration-resultant signal reaches the given threshold value V1 at a moment t1, and then reaches the given threshold value V2 at a moment t2. As shown in FIG. 4, the comparator in the first sub signal processor 13 starts to output a high-level signal at the moment t1 in response to the related integration-resultant signal. As shown in FIG. 5, the comparator in the second sub signal processor 14 starts to output a high-level signal at the moment t2 in response to the related integration-resultant signal.

As previously described, the integrating circuit in each of the first and second sub signal processors 23 and 24 integrates the output signal of the acceleration sensor 21. The integrating circuit in each of the first and second sub signal processors 23 and 24 generates an integration-resultant signal. A given threshold value (a given threshold voltage) V3 used by the first sub signal processor 23 is smaller than a given threshold value (a given threshold voltage) V4 used by the second sub signal processor 24. The comparator in the first sub signal processor 23 outputs a high-level signal or a low-level signal in response to the related integration-resultant signal. The comparator in the second sub signal processor 24 outputs a high-level signal or a low-level signal in response to the related integration-resultant signal.

The AND circuit 15 executes AND operation between the output signal of the sub signal processor 14 in the first main section 1 and the output signal of the sub signal processor 23 in the second main section 2. The AND circuit 15 outputs a signal representative of the AND-operation result to the control terminal of the switch 17 in the first main section 1. The AND circuit 25 executes AND operation between the output signal of the sub signal processor 13 in the first main section 1 and the output signal of the sub signal processor 24 in the second main section 2. The AND circuit 25 outputs a signal representative of the AND-operation result to the control terminal of the switch 27 in the second main section 2.

The control terminal of the switch 16 is connected to the output terminal of the first sub signal processor 13 in the first main section 1. The control terminal of the switch 26 is connected to the output terminal of the first sub signal processor 23 in the second main section 2. The switch 16, the first trigger component 18, and the switch 17 are connected in series with the vehicle battery 3. The switch 26, the second trigger component 28, and the switch 27 are connected in series with the vehicle battery 3.

Figure 6:
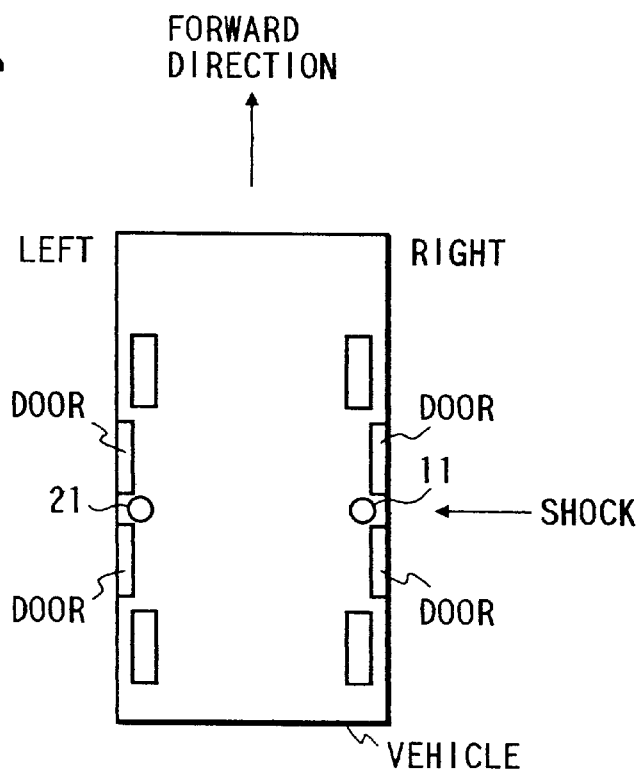
FIG. 6 is a diagram of an automotive vehicle and acceleration sensors.

The triggering device 100 operates as follows. It is now assumed that as shown in FIG. 6, the right-hand side of the automotive vehicle collides with an object. The acceleration sensors 11 and 12 detect deceleration (or acceleration) of the automotive vehicle which is caused by the collision. In this case, the voltage of the output signal of the acceleration sensor 11 which is located at the right-hand side of the automotive vehicle varies such as shown in the portion (a) of FIG. 7 while the voltage of the output signal of the acceleration sensor 21 which is located at the left-hand side of the automotive vehicle varies such as shown in the portion (c) of FIG. 7. During the collision, the voltage of the output signal of the right-side acceleration sensor 11 is greater than the voltage of the output signal of the left-side acceleration sensor 21.

The detection signals are inputted into the signal processors 12 and 22 from the acceleration sensors 11 and 21 respectively. The detection signal inputted into the signal processor 12 is processed by the first and second sub signal processors 13 and 14 in response to the different threshold values V1 and V2 respectively. The detection signal inputted into the signal processor 22 is processed by the first and second sub signal processors 23 and 24 in response to the different threshold values V3 and V4 respectively.

The output signal of the acceleration sensor 11 is integrated and processed by the integrating circuit in each of the first and second sub signal processors 13 and 14. The integrating circuit in each of the first and second sub signal processors 13 and 14 generates an integration-resultant signal which varies as shown in the portion (b) of FIG. 7. The integration-resultant signal reaches the given threshold value V1 in the first sub signal processor 13 at a moment t1, and then reaches the given threshold value V2 in the second sub signal processor 14 at a moment t2.

The output signal of the acceleration sensor 21 is integrated and processed by the integrating circuit in each of the first and second sub signal processors 23 and 24. The integrating circuit in each of the first and second sub signal processors 23 and 24 generates an integration-resultant signal which varies as shown in the portion (d) of FIG. 7. The integration-resultant signal reaches the given threshold value V3 in the first sub signal processor 23 at a moment t3. During the collision, the voltage of the output signal of the left-side acceleration sensor 21 is smaller than the voltage of the output signal of the right-side acceleration sensor 11. In addition, the level of the integration-resultant signal in the second sub signal processor 24 remains smaller than the given threshold value V4.

As shown in the portion (e) of FIG. 7, the first sub signal processor 13 in the first main section 1 starts to output a high-level signal at the moment t1 at which the related integration-resultant signal reaches the given threshold value V1. As shown in the portion (f) of FIG. 7, the second sub signal processor 14 in the first main section 1 starts to output a high-level signal at the moment t2 at which the related integration-resultant signal reaches the given threshold value V2. The moment t2 follows the moment t1. As shown in the portion (l) of FIG. 7, the switch 16 assumes an ON state in response to the high-level signal outputted from the first sub signal processor 13.

As shown in the portion (g) of FIG. 7, the first sub signal processor 23 in the second main section 2 starts to output a high-level signal at the moment t3 at which the related integration-resultant signal reaches the given threshold value V3. The moment t3 exists between the moments t1 and t2. The integration-resultant signals in the sub signal processors 14 and 23 reach the given threshold values V2 and V3 respectively. At the moment t2, both the two input signals to the AND circuit 15 are in high-level states so that the AND circuit 15 starts to output a high-level signal to the switch 17 as shown in the portion (i) of FIG. 7. As shown in the portion (k) of FIG. 7, the switch 17 assumes an ON state in response to the high-level signal outputted from the AND circuit 15.

In this way, both the switches 16 and 17 assume the ON states upon the collision of the right-hand side of the automotive vehicle with the object. Thus, as shown in the portion (l) of FIG. 7, at the moment t2, the first trigger component 18 is energized and is changed to an ON state so that the air-bag device at the right-hand side of the automotive vehicle is activated.

As previously described, the first sub signal processor 23 in the second main section 2 starts to output a high-level signal at the moment t3 at which the related integration-resultant signal reaches the given threshold value V3. As shown in the portion (n) of FIG. 7, the switch 26 assumes an ON state in response to the high-level signal outputted from the first sub signal processor 23. As previously described, the level of the integration-resultant signal in the second sub signal processor 24 remains smaller than the given threshold value V4. Thus, as shown in the portion (h) of FIG. 7, the second sub signal processor 24 continues to output a low-level signal to the AND circuit 25. The low-level signal outputted from the second sub signal processor 24 to the AND circuit 25 causes the AND circuit 25 to continuously output a low-level signal to the switch 27 as shown in the portion (m) of FIG. 7. Therefore, the switch 27 remains in an OFF state as shown in the portion (o) of FIG. 7. Thus, the second trigger component 28 continues to be in an OFF state as shown in the portion (p) of FIG. 7 so that the air-bag device at the left-hand side of the automotive vehicle is not activated.

In this way, only the air-bag device at the right-hand side of the automotive vehicle can be activated upon a collision of the right-hand side of the automotive vehicle with an object.

Figure 8:
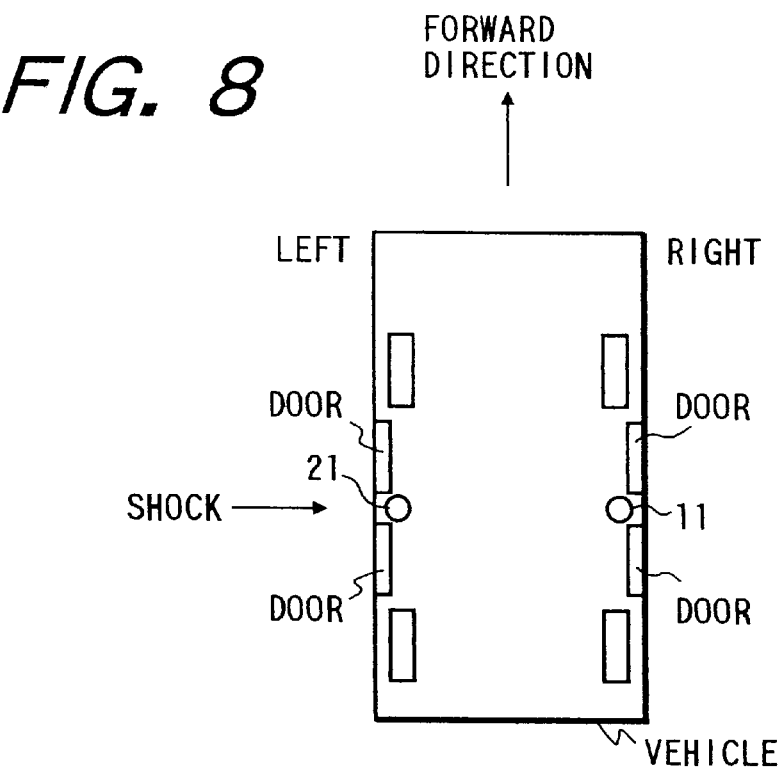
FIG. 8 is a diagram of an automotive vehicle and acceleration sensors.

It is now assumed that as shown in FIG. 8, the left-hand side of the automotive vehicle collides with an object. The acceleration sensors 11 and 12 detect deceleration (or acceleration) of the automotive vehicle which is caused by the collision. In this case, the voltage of the output signal of the acceleration sensor 11 which is located at the right-hand side of the automotive vehicle varies such as shown in the portion (a) of FIG. 9 while the voltage of the output signal of the acceleration sensor 21 which is located at the left-hand side of the automotive vehicle varies such as shown in the portion (c) of FIG. 9. During the collision, the voltage of the output signal of the left-side acceleration sensor 21 is greater than the voltage of the output signal of the right-side acceleration sensor 11.

The detection signals are inputted into the signal processors 12 and 22 from the acceleration sensors 11 and 21 respectively. The detection signal inputted into the signal processor 12 is processed by the first and second sub signal processors 13 and 14 in response to the different threshold values V1 and V2 respectively. The detection signal inputted into the signal processor 22 is processed by the first and second sub signal processors 23 and 24 in response to the different threshold values V3 and V4 respectively.

The output signal of the acceleration sensor 11 is integrated and processed by the integrating circuit in each of the first and second sub signal processors 13 and 14. The integrating circuit in each of the first and second sub signal processors 13 and 14 generates an integration-resultant signal which varies as shown in the portion (b) of FIG. 9. The integration-resultant signal reaches the given threshold value V1 in the first sub signal processor 13 at a moment t1. During the collision, the voltage of the output signal of the right-side acceleration sensor 11 is smaller than the voltage of the output signal of the left-side acceleration sensor 21. In addition, the level of the integration-resultant signal in the second sub signal processor 14 remains smaller than the given threshold value V2.

The output signal of the acceleration sensor 21 is integrated and processed by the integrating circuit in each of the first and second sub signal processors 23 and 24. The integrating circuit in each of the first and second sub signal processors 23 and 24 generates an integration-resultant signal which varies as shown in the portion (d) of FIG. 9. The integration-resultant signal reaches the given threshold value V3 in the first sub signal processor 23 at a moment t3, and then reaches the given threshold value V4 in the second sub signal processor 24 at a moment t4. The moment t3 precedes the moment t1. The moment t4 follows the moment t1.

As shown in the portion (g) of FIG. 9, the first sub signal processor 23 in the second main section 2 starts to output a high-level signal at the moment t3 at which the related integration-resultant signal reaches the given threshold value V3. As shown in the portion (h) of FIG. 9, the second sub signal processor 24 in the second main section 2 starts to output a high-level signal at the moment t4 at which the related integration-resultant signal reaches the given threshold value V4. The moment t4 follows the moment t3. As shown in the portion (n) of FIG. 9, the switch 26 assumes an ON state in response to the high-level signal outputted from the first sub signal processor 23.

As shown in the portion (e) of FIG. 9, the first sub signal processor 13 in the first main section 1 starts to output a high-level signal at the moment t1 at which the related integration-resultant signal reaches the given threshold value V1. The moment t1 exists between the moments t3 and t4. The integration-resultant signals in the sub signal processors 13 and 24 reach the given threshold values V1 and V4 respectively. At the moment t4, both the two input signals to the AND circuit 25 are in high-level states so that the AND circuit 25 starts to output a high-level signal to the switch 27 as shown in the portion (m) of FIG. 9. As shown in the portion (o) of FIG. 9, the switch 27 assumes an ON state in response to the high-level signal outputted from the AND circuit 25.

In this way, both the switches 26 and 27 assume the ON states upon the collision of the left-hand side of the automotive vehicle with the object. Thus, as shown in the portion (p) of FIG. 9, at the moment t4, the second trigger component 28 is energized and is changed to an ON state so that the air-bag device at the left-hand side of the automotive vehicle is activated.

As previously described, the first sub signal processor 13 in the first main section 1 starts to output a high-level signal at the moment t1 at which the related integration-resultant signal reaches the given threshold value V1. As shown in the portion (j) of FIG. 9, the switch 16 assumes an ON state in response to the high-level signal outputted from the first sub signal processor 13. As previously described, the level of the integration-resultant signal in the second sub signal processor 14 remains smaller than the given threshold value V2. Thus, as shown in the portion (f) of FIG. 9, the second sub signal processor 14 continues to output a low-level signal to the AND circuit 15. The low-level signal outputted from the second sub signal processor 14 to the AND circuit 15 causes the AND circuit 15 to continuously output a low-level signal to the switch 17 as shown in the portion (i) of FIG. 9. Therefore, the switch 17 remains in an OFF state as shown in the portion (k) of FIG. 9. Thus, the first trigger component 18 continues to be in an OFF state as shown in the portion (l) of FIG. 9 so that the air-bag device at the right-hand side of the automotive vehicle is not activated.

In this way, only the air-bag device at the left-hand side of the automotive vehicle can be activated upon a collision of the left-hand side of the automotive vehicle with an object.

As previously described, the first main section 1 includes the AND circuit 15 and the switch 17. The AND circuit 15 executes AND operation between the output signal of the sub signal processor 14 in the first main section 1 and the output signal of the sub signal processor 23 in the second main section 2. The switch 17 which follows the AND circuit 15 operates in response to the result of the AND operation by the AND circuit 15. Accordingly, the first trigger component 18, that is, the air-bag device at the right-hand side of the automotive vehicle, is controlled in response to both the output signals of the acceleration sensors 11 and 21. This design provides a redundancy in the acceleration-responsive control of the first trigger component 18, thereby making it possible to prevent the air-bag device at the right-hand side of the automotive vehicle from being activated by causes other than collisions. Specifically, even in the case where the integration-result signals in the first and second sub signal processors 13 and 14 reach the given threshold values V1 and V2 respectively, the switch 17 remains in the OFF state provided that the integration-result signal in the sub signal processor 23 of the second main section 2 does not reach the given threshold value V3. This design enables reliable operation of the triggering device 100.

As previously described, the second main section 2 includes the AND circuit 25 and the switch 27. The AND circuit 25 executes AND operation between the output signal of the sub signal processor 24 in the second main section 2 and the output signal of the sub signal processor 13 in the first main section 1. The switch 27 which follows the AND circuit 25 operates in response to the result of the AND operation by the AND circuit 25. Accordingly, the second trigger component 28, that is, the air-bag device at the left-hand side of the automotive vehicle, is controlled in response to both the output signals of the acceleration sensors 11 and 21. This design provides a redundancy in the acceleration-responsive control of the second trigger component 28, thereby making it possible to prevent the air-bag device at the left-hand side of the automotive vehicle from being activated by causes other than collisions. Specifically, even in the case where the integration-result signals in the first and second sub signal processors 23 and 24 reach the given threshold values V3 and V4 respectively, the switch 27 remains in the OFF state provided that the integration-result signal in the sub signal processor 13 of the first main section 1 does not reach the given threshold value V1. This design enables reliable operation of the triggering device 100.

Although each of the first and second trigger components 18 and 28 responds to both the output signals of the acceleration sensors 11 and 21, there are the two acceleration sensors 11 and 21 and also the two trigger components 18 and 28. This design can implement a miniature structure and a low cost of the triggering device 100.

It should be noted that the first and second main sections 1 and 2 of the triggering device 100 may be provided on pillar portions, locker portions, or front portions of the vehicle body near the right-hand and left-hand doors respectively.

Each of the first and second trigger components 18 and 28 may respond to the output signals of three or more acceleration sensors. The triggering device 100 may be modified to operate on three or more air-bag devices. The triggering device 100 may be applied to air-bag devices which are designed for a frontal crash or an inclined crash.

The triggering device 100 may be additionally provided with a fail-safe function which compensates for the occurrence of a malfunction of one of the acceleration sensors 11 and 21. In an example of the fail-safe function, leading portions of collision-responsive changes in the output signals of the acceleration sensors 11 and 21 are detected, and each of the first and second trigger components 18 and 28 responds to one of the detected leading portions.

The air-bag devices may be replaced by other safety devices such as vehicle safety-belt pretensioners (tighteners).

Second Embodiment

Figure 10:
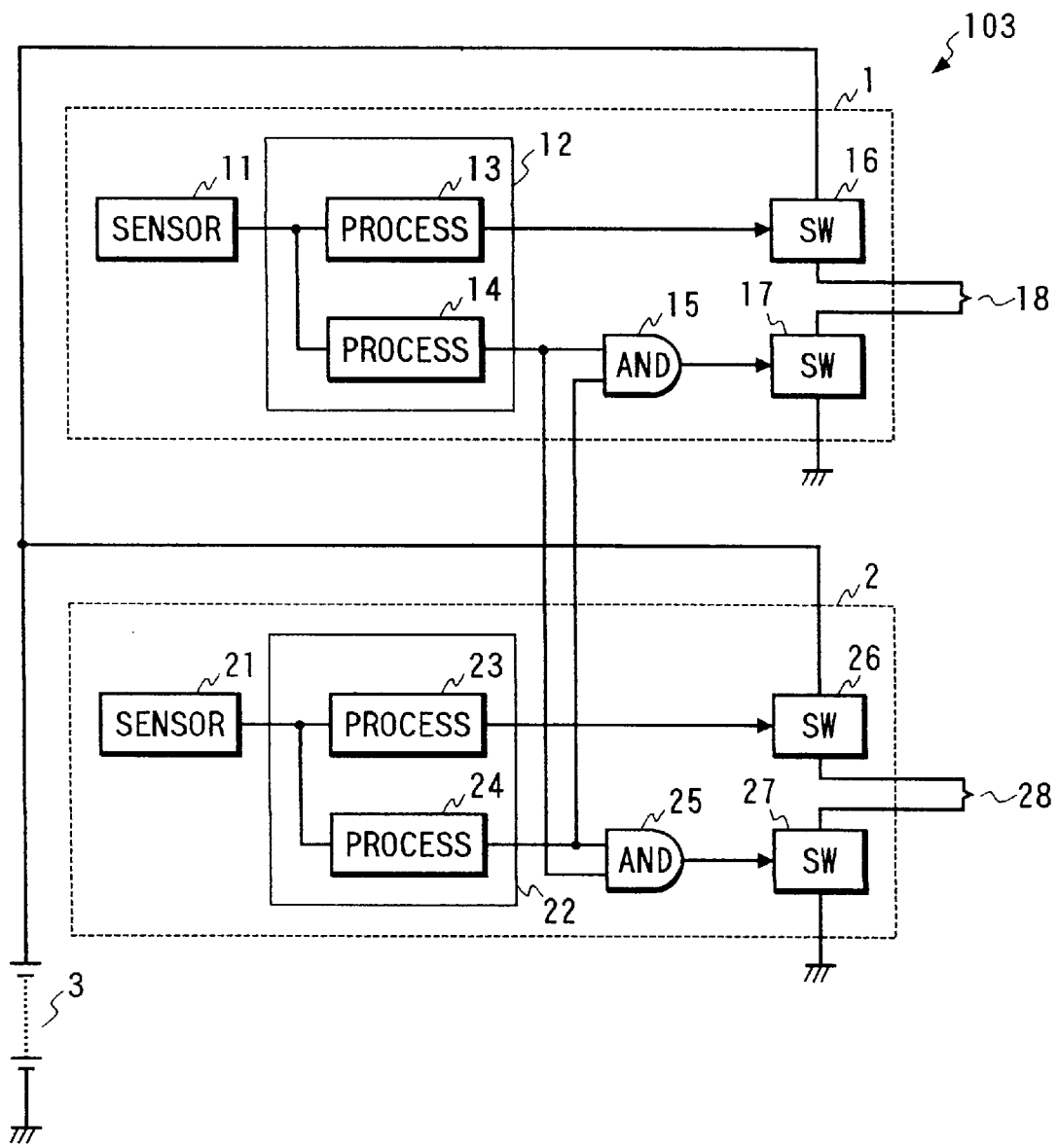
FIG. 10 is a block diagram of a triggering device according to a second embodiment of this invention.

FIG. 10 shows a triggering device 103 according to a second embodiment of this invention. The triggering device 103 is similar to the triggering device 100 of FIG. 1 except for design changes indicated hereinafter. In the triggering device 103, a first input terminal of an AND circuit 15 is connected to the output terminal of a second sub signal processor 14 in a first main section 1, and a second input terminal of the AND circuit 15 is connected to the output terminal of a second sub signal processor 24 in a second main section 2. In the triggering device 103, a first input terminal of an AND circuit 25 is connected to the output terminal of the second sub signal processor 24 in the second main section 2, and a second input terminal of the AND circuit 25 is connected to the output terminal of the second sub signal processor 14 in the first main section 1.

In the triggering device 103, each of the AND circuits 15 and 25 responds to the output signals of the sub signal processors 14 and 24. The sub signal processors 14 and 24 use given threshold values V2 and V4 which are greater than given threshold values V1 and V3 used by sub signal processors 13 and 23 respectively. A change of each of first and second trigger components 18 and 28 to an ON state is allowed provided that integration-result signals in the sub signal processors 14 and 24 reach the given threshold values V2 and V4 respectively. Since the given threshold values V1 and V3 are smaller than the given threshold values V2 and V4 respectively, integration-resultant signals in the sub signal processors 13 and 23 reach the given threshold values V1 and V3 respectively in the case where the integration-result signals in the sub signal processors 14 and 24 reach the given threshold values V2 and V4 respectively.

Accordingly, in the case where the integration-result signals in the sub signal processors 14 and 24 reach the given threshold values V2 and V4 respectively, switches 16 and 26 and also the switches 17 and 27 assume ON states respectively so that the first and second trigger components 18 and 28 change to the ON states at essentially the same time. Thus, in this case, two air-bag devices are activated at essentially the same time.

In the triggering device 103, it is preferable that acceleration sensors 11 and 21 are located in a same side of an automotive vehicle.

Figure 11:
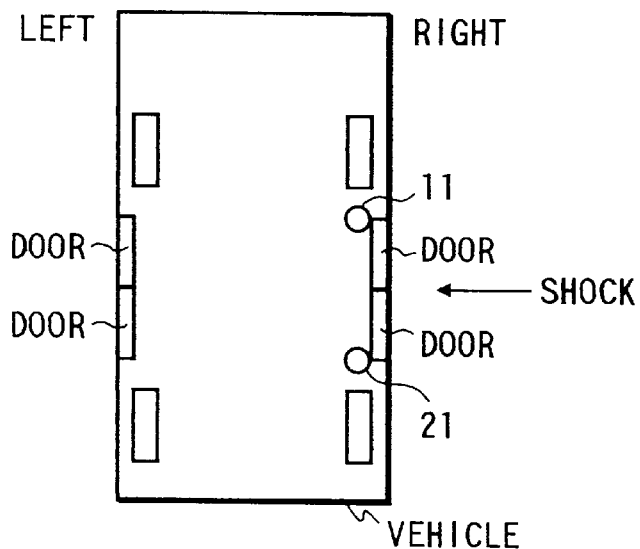
FIG. 11 is a diagram of an automotive vehicle and acceleration sensors.

As shown in FIG. 11, the acceleration sensors 11 and 21 are located near a right-hand front door and a right-hand rear door of the automotive vehicle respectively. The air-bag devices are provided at the right-hand front door and the right-hand rear door of the automotive vehicle respectively.

The triggering device 103 operates as follows. It is now assumed that as shown in FIG. 11, the right-hand side of the automotive vehicle collides with an object. The acceleration sensors 11 and 12 detect deceleration (or acceleration) of the automotive vehicle which is caused by the collision. Since the acceleration sensors 11 and 12 are provided at the same side of the automotive vehicle which undergoes the collision, the voltages of the output signals of the acceleration sensors 11 and 21 are approximately equal to each other and exhibit time-domain variations with large amplitudes as shown in the portions (a) and (c) of FIG. 12 respectively.

The detection signals are inputted into signal processors 12 and 22 from the acceleration sensors 11 and 21 respectively. The detection signal inputted into the signal processor 12 is processed by the first and second sub signal processors 13 and 14 in response to the different threshold values V1 and V2 respectively. The detection signal inputted into the signal processor 22 is processed by the first and second sub signal processors 23 and 24 in response to the different threshold values V3 and V4 respectively.

The output signal of the acceleration sensor 11 is integrated and processed by the integrating circuit in each of the first and second sub signal processors 13 and 14. The integrating circuit in each of the first and second sub signal processors 13 and 14 generates an integration-resultant signal which varies as shown in the portion (b) of FIG. 12. The integration-resultant signal reaches the given threshold value V1 in the first sub signal processor 13 at a moment t1, and then reaches the given threshold value V2 in the second sub signal processor 14 at a moment t2.

The output signal of the acceleration sensor 21 is integrated and processed by the integrating circuit in each of the first and second sub signal processors 23 and 24. The integrating circuit in each of the first and second sub signal processors 23 and 24 generates an integration-resultant signal which varies as shown in the portion (d) of FIG. 12. The integration-resultant signal reaches the given threshold value V3 in the first sub signal processor 23 at a moment t3, and then reaches the given threshold value V4 in the second sub signal processor 24 at a moment t4.

As shown in the portion (e) of FIG. 12, the first sub signal processor 13 in the first main section 1 starts to output a high-level signal at the moment t1 at which the related integration-resultant signal reaches the given threshold value V1. As shown in the portion (f) of FIG. 12, the second sub signal processor 14 in the first main section 1 starts to output a high-level signal at the moment t2 at which the related integration-resultant signal reaches the given threshold value V2. The moment t2 follows the moment t1. As shown in the portion (j) of FIG. 12, the switch 16 assumes an ON state in response to the high-level signal outputted from the first sub signal processor 13.

As shown in the portion (g) of FIG. 12, the first sub signal processor 23 in the second main section 2 starts to output a high-level signal at the moment t3 at which the related integration-resultant signal reaches the given threshold value V3. As shown in the portion (h) of FIG. 12, the second sub signal processor 24 in the second main section 2 starts to output a high-level signal at the moment t4 at which the related integration-resultant signal reaches the given threshold value V4. The moment t4 follows the moment t3. As shown in the portion (n) of FIG. 12, the switch 26 assumes an ON state in response to the high-level signal outputted from the first sub signal processor 23.

Since the integration-resultant signals in the sub signal processors 14 and 24 reach the given threshold values V2 and V4 respectively, both the two input signals to the AND circuit 15 are in high-level states so that the AND circuit 15 starts to output a high-level signal to the switch 17 as shown in the portion (i) of FIG. 12. As shown in the portion (k) of FIG. 12, the switch 17 assumes an ON state in response to the high-level signal outputted from the AND circuit 15. At substantially the same time, the AND circuit 25 starts to output a high-level signal to the switch 27 as shown in the portion (m) of FIG. 12. As shown in the portion (o) of FIG. 12, the switch 27 assumes an ON state in response to the high-level signal outputted from the AND circuit 25.

In this way, both the switches 16 and 17 assume the ON states upon the collision of the right-hand side of the automotive vehicle with the object. Thus, as shown in the portion (l) of FIG. 12, the first trigger component 18 is energized and is changed to an ON state so that the air-bag device at the right-hand front door of the automotive vehicle is activated. In addition, both the switches 26 and 27 assume the ON states upon the collision of the right-hand side of the automotive vehicle with the object. Thus, as shown in the portion (p) of FIG. 12, the second trigger component 28 is energized and is changed to an ON state so that the air-bag device at the right-hand rear door of the automotive vehicle is activated. The activation of the air-bag device at the right-hand rear door of the automotive vehicle is substantially simultaneous with the activation of the air-bag device at the right-hand front door of the automotive vehicle.

Figure 13:
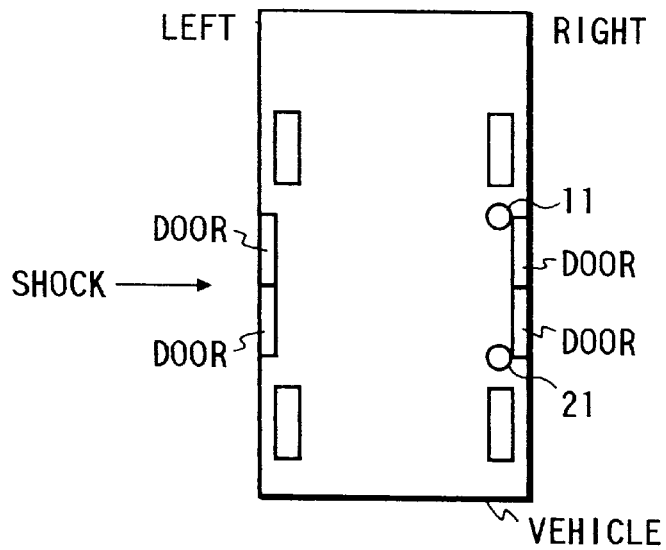
FIG. 13 is a diagram of an automotive vehicle and acceleration sensors.

It is now assumed that as shown in FIG. 13, the left-hand side of the automotive vehicle collides with an object. The acceleration sensors 11 and 12 detect deceleration (or acceleration) of the automotive vehicle which is caused by the collision. Since the acceleration sensors 11 and 12 are provided at the same side of the automotive vehicle which is remote from the position of the collision, the voltages of the output signals of the acceleration sensors 11 and 21 are approximately equal to each other and exhibit time-domain variations with small amplitudes as shown in the portions (a) and (c) of FIG. 14 respectively.

The detection signals are inputted into signal processors 12 and 22 from the acceleration sensors 11 and 21 respectively. The detection signal inputted into the signal processor 12 is processed by the first and second sub signal processors 13 and 14 in response to the different threshold values V1 and V2 respectively. The detection signal inputted into the signal processor 22 is processed by the first and second sub signal processors 23 and 24 in response to the different threshold values V3 and V4 respectively.

The output signal of the acceleration sensor 11 is integrated and processed by the integrating circuit in each of the first and second sub signal processors 13 and 14. The integrating circuit in each of the first and second sub signal processors 13 and 14 generates an integration-resultant signal which varies as shown in the portion (b) of FIG. 14. The integration-resultant signal reaches the given threshold value V1 in the first sub signal processor 13 at a moment t1 but does not reach the given threshold value V2 in the second sub signal processor 14. It should be noted that the given threshold value V2 is greater than the given threshold value V1.

The output signal of the acceleration sensor 21 is integrated and processed by the integrating circuit in each of the first and second sub signal processors 23 and 24. The integrating circuit in each of the first and second sub signal processors 23 and 24 generates an integration-resultant signal which varies as shown in the portion (d) of FIG. 14. The integration-resultant signal reaches the given threshold value V3 in the first sub signal processor 23 at a moment t3 but does not reach the given threshold value V4 in the second sub signal processor 24. It should be noted that the given threshold value V4 is greater than the given threshold value V3.

As shown in the portion (e) of FIG. 14, the first sub signal processor 13 in the first main section 1 starts to output a high-level signal at the moment t1 at which the related integration-resultant signal reaches the given threshold value V1. As shown in the portion (f) of FIG. 14, the second sub signal processor 14 in the first main section 1 continues to output a low-level signal since the integration-result signal in the second sub signal processor 14 does not reach the given threshold value V2. As shown in the portion (j) of FIG. 14, the switch 16 assumes an ON state in response to the high-level signal outputted from the first sub signal processor 13.

As shown in the portion (g) of FIG. 14, the first sub signal processor 23 in the second main section 2 starts to output a high-level signal at the moment t3 at which the related integration-resultant signal reaches the given threshold value V3. As shown in the portion (h) of FIG. 14, the second sub signal processor 24 in the second main section 2 continues to output a low-level signal since the integration-result signal in the second sub signal processor 24 does not reach the given threshold value V4. As shown in the portion (n) of FIG. 14, the switch 26 assumes an ON state in response to the high-level signal outputted from the first sub signal processor 23.

Since the integration-resultant signals in the sub signal processors 14 and 24 do not reach the given threshold values V2 and V4 respectively, both the two input signals to the AND circuit 15 are in low-level states so that the AND circuit 15 continues to output a low-level signal to the switch 17 as shown in the portion (i) of FIG. 14. As shown in the portion (k) of FIG. 14, the switch 17 is kept in an OFF state by the low-level signal outputted from the AND circuit 15. In addition, both the two input signals to the AND circuit 25 are in the low-level states so that the AND circuit 25 continues to output a low-level signal to the switch 27 as shown in the portion (m) of FIG. 14. As shown in the portion (o) of FIG. 14, the switch 27 is kept in an OFF state by the low-level signal outputted from the AND circuit 25.

In this way, the switches 16 and 26 are changed to the ON states while the switches 17 and 27 are kept in the OFF states. Thus, the first trigger component 18 continues to be in an OFF state as shown in the portion (l) of FIG. 14 so that the air-bag device at the right-hand front door of the automotive vehicle is not activated. In addition, the second trigger component 28 continues to be in an OFF state as shown in the portion (p) of FIG. 14 so that the air-bag device at the right-hand rear door of the automotive vehicle is not activated.

As understood from the previous description, each of the first and second trigger components 18 and 28 responds to both the output signals of the acceleration sensors 11 and 21. This design provides a redundancy in the acceleration-responsive control of each of the first and second trigger components 18 and 28. The redundancy results in an advantage of the triggering device 103. The acceleration sensors 11 and 21 are located at positions of the same side of the automotive vehicle near the front and rear doors respectively. Accordingly, the air-bag devices can be approximately simultaneously activated upon a collision between that side of the automotive vehicle and an object. In addition, it is possible to prevent the air-bag devices from being activated upon a collision between the other side of the automotive vehicle and an object.

Each of the first and second trigger components 18 and 28 may respond to the output signals of three or more acceleration sensors. The triggering device 103 may be modified to operate on three or more air-bag devices. The triggering device 103 may be applied to air-bag devices which are designed for a frontal crash or an inclined crash.

The triggering device 103 may be additionally provided with a fail-safe function which compensates for the occurrence of a malfunction of one of the acceleration sensors 11 and 21. In an example of the fail-safe function, leading portions of collision-responsive changes in the output signals of the acceleration sensors 11 and 21 are detected, and each of the first and second trigger components 18 and 28 responds to one of the detected leading portions.

The air-bag devices may be replaced by other safety devices such as vehicle safety-belt pretensioners (tighteners).

Third Embodiment

Figure 15:
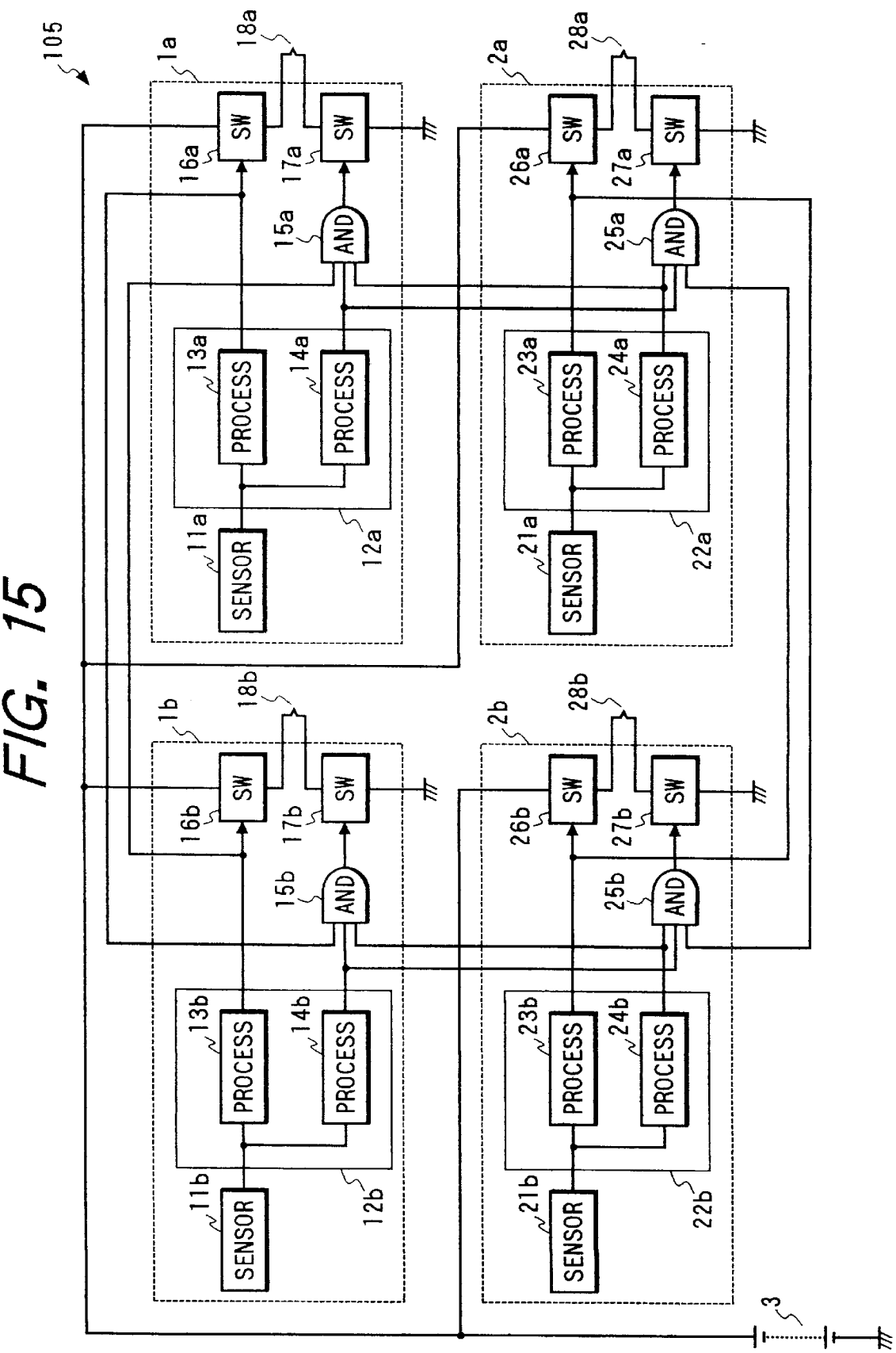
FIG. 15 is a block diagram of a triggering device according to a third embodiment of this invention.

With reference to FIG. 15, a triggering device 105 operates on air-bag devices (not shown) provided at a front part and a rear part of a right-hand side of an automotive vehicle and at a front part and a rear part of a left-hand side of the automotive vehicle respectively.

The triggering device 105 includes a first main section 1a, a second main section 2a, a third main section 1b, and a fourth main section 2b, a vehicle battery 3, a first trigger component 18a, a second trigger component 28a, a third trigger component 18b, and a fourth trigger component 28b. The first, second, third, and fourth main sections 1a, 2a, 1b, and 2b are located at the front part and the rear part of the right-hand side of the automotive vehicle and the front part and the rear part of the left-hand side of the automotive vehicle respectively. Each of the first, second, third, and fourth main sections 1a, 2a, 1b, and 2b detects the deceleration (or the acceleration) of the automotive vehicle, and generates a signal representing the detected deceleration. Each of the first, second, third, and fourth main sections 1a, 2a, 1b, and 2b processes the deceleration signal, and outputs a signal depending on the result of the processing of the deceleration signal.

The first, second, third, and fourth trigger components 18a, 28a, 18b, and 28b follow the first, second, third, and fourth main sections 1a, 2a, 1b, and 2b respectively. The first, second, third, and fourth trigger components 18a, 28a, 18b, and 28b are of the electrically-powered type. The first, second, third, and fourth trigger components 18a, 28a, 18b, and 28b serve to activate the air-bag devices respectively. The first trigger component 18a is controlled by the output signal of the first main section 1a. The second trigger component 28a is controlled by the output signal of the second main section 2a. The third trigger component 18b is controlled by the output signal of the third main section 1b. The fourth trigger component 28b is controlled by the output signal of the fourth main section 2b.

The vehicle battery 3 is connected to the first, second, third, and fourth main sections 1a, 2a, 1b, and 2b. The vehicle battery 3 electrically powers the first, second, third, and fourth main sections 1a, 2a, 1b, and 2b.

The first main section 1a of the triggering device 105 includes an acceleration sensor 11a, a signal processor 12a, an AND circuit 15a, and switches 16a and 17a. The acceleration sensor 11a detects deceleration (or acceleration) of the body of the automotive vehicle, and outputs a detection signal representative thereof. The signal processor 12a follows the acceleration sensor 11a. The signal processor 12a integrates and processes the detection signal outputted from the acceleration sensor 11a. The switch 16a follows the signal processor 12a. The AND circuit 15a follows the signal processor 12a. The switch 17a follows the AND circuit 15a. The switch 16a, the first trigger component 18a, and the switch 17a are connected in series with the vehicle battery 3. The first trigger component 18a is energized in response to the result of AND operation between the switches 16a and 17a.

The second main section 2a of the triggering device 105 includes an acceleration sensor 21a, a signal processor 22a, an AND circuit 25a, and switches 26a and 27a. The acceleration sensor 21a detects deceleration (or acceleration) of the body of the automotive vehicle, and outputs a detection signal representative thereof. The signal processor 22a follows the acceleration sensor 21a. The signal processor 22a integrates and processes the detection signal outputted from the acceleration sensor 21a. The switch 26a follows the signal processor 22a. The AND circuit 25a follows the signal processor 22a. The switch 27a follows the AND circuit 25a. The switch 26a, the second trigger component 28a, and the switch 27a are connected in series with the vehicle battery 3. The second trigger component 28a is energized in response to the result of AND operation between the switches 26a and 27a.

The third main section 1b of the triggering device 105 includes an acceleration sensor 11b, a signal processor 12b, an AND circuit 15b, and switches 16b and 17b. The acceleration sensor 11b detects deceleration (or acceleration) of the body of the automotive vehicle, and outputs a detection signal representative thereof. The signal processor 12b follows the acceleration sensor 11b. The signal processor 12b integrates and processes the detection signal outputted from the acceleration sensor 11b. The switch 16b follows the signal processor 12b. The AND circuit 15b follows the signal processor 12b. The switch 17b follows the AND circuit 15b. The switch 16b, the third trigger component 18b, and the switch 17b are connected in series with the vehicle battery 3. The third trigger component 18b is energized in response to the result of AND operation between the switches 16b and 17b.

The fourth main section 2b of the triggering device 105 includes an acceleration sensor 21b, a signal processor 22b, an AND circuit 25b, and switches 26b and 27b. The acceleration sensor 21b detects deceleration (acceleration) of the body of the automotive vehicle, and outputs a detection signal representative thereof. The signal processor 22b follows the acceleration sensor 21b. The signal processor 22b integrates and processes the detection signal outputted from the acceleration sensor 21b. The switch 26b follows the signal processor 22b. The AND circuit 25b follows the signal processor 22b. The switch 27b follows the AND circuit 25b. The switch 26b, the fourth trigger component 28b, and the switch 27b are connected in series with the vehicle battery 3. The fourth trigger component 28b is energized in response to the result of AND operation between the switches 26b and 27b.

The signal processor 12a includes first and second sub signal processors 13a and 14a using different threshold values (corresponding to processing levels) for crash judgment or collision decision respectively. The first and second sub signal processors 13a and 14a receive the detection signal from the acceleration sensor 11a. The first sub signal processor 13a is followed by the switch 16a and a first input terminal of the AND circuit 15b. The second sub signal processor 14a is followed by a first input terminal of the AND circuit 15a and a first input terminal of the AND circuit 25a. Each of the first and second sub signal processors 13a and 14a includes a combination of an integrating circuit and a comparator. Each of the first and second sub signal processors 13a and 14a integrates the detection signal outputted from the acceleration sensor 11a, and outputs a high-level signal when the resultant integration value reaches a given threshold value.

The signal processor 22a includes first and second sub signal processors 23a and 24a using different threshold values (corresponding to processing levels) for crash judgment or collision decision respectively. The first and second sub signal processors 23a and 24a receive the detection signal from the acceleration sensor 21a. The first sub signal processor 23a is followed by the switch 26a and a first input terminal of the AND circuit 25b. The second sub signal processor 24a is followed by a second input terminal of the AND circuit 25a and a second input terminal of the AND circuit 15a. Each of the first and second sub signal processors 23a and 24a includes a combination of an integrating circuit and a comparator. Each of the first and second sub signal processors 23a and 24a integrates the detection signal outputted from the acceleration sensor 21a, and outputs a high-level signal when the resultant integration value reaches a given threshold value.

The signal processor 12b includes first and second sub signal processors 13b and 14b using different threshold values (corresponding to processing levels) for crash judgment or collision decision respectively. The first and second sub signal processors 13b and 14b receive the detection signal from the acceleration sensor 11b. The first sub signal processor 13b is followed by the switch 16b and a third input terminal of the AND circuit 15a. The second sub signal processor 14b is followed by a second input terminal of the AND circuit 15b and a second input terminal of the AND circuit 25b. Each of the first and second sub signal processors 13b and 14b includes a combination of an integrating circuit and a comparator. Each of the first and second sub signal processors 13b and 14b integrates the detection signal outputted from the acceleration sensor 11b, and outputs a high-level signal when the resultant integration value reaches a given threshold value.

The signal processor 22b includes first and second sub signal processors 23b and 24b using different threshold values (corresponding to processing levels) for crash judgment or collision decision respectively. The first and second sub signal processors 23b and 24b receive the detection signal from the acceleration sensor 21b. The first sub signal processor 23b is followed by the switch 26b and a third input terminal of the AND circuit 25a. The second sub signal processor 24b is followed by a third input terminal of the AND circuit 25b and a third input terminal of the AND circuit 15b. Each of the first and second sub signal processors 23b and 24b includes a combination of an integrating circuit and a comparator. Each of the first and second sub signal processors 23b and 24b integrates the detection signal outputted from the acceleration sensor 21b, and outputs a high-level signal when the resultant integration value reaches a given threshold value.

The given threshold value in the first sub signal processor 13a is smaller than the given threshold value in the second sub signal processor 14a. The given threshold value in the first sub signal processor 23a is smaller than the given threshold value in the second sub signal processor 24a. The given threshold value in the first sub signal processor 13b is smaller than the given threshold value in the second sub signal processor 14b. The given threshold value in the first sub signal processor 23b is smaller than the given threshold value in the second sub signal processor 24b.

Upon a collision between the right-hand side of the automotive vehicle and an object, only the air-bag devices located at the right-hand side of the automotive vehicle can be approximately simultaneously activated. Upon a collision between the left-hand side of the automotive vehicle and an object, only the air-bag devices located at the left-hand side of the automotive vehicle can be approximately simultaneously activated.

Each of the first, second, third, and fourth trigger components 18a, 28a, 18b, and 28b may respond to the output signals of four or more acceleration sensors. The triggering device 105 may be modified to operate on five or more air-bag devices. The triggering device 105 may be applied to air-bag devices which are designed for a frontal crash or an inclined crash.

The triggering device 105 may be additionally provided with a fail-safe function which compensates for the occurrence of a malfunction of at least one of the acceleration sensors 11a, 21a, 11b, and 21b. In an example of the fail-safe function, leading portions of collision-responsive changes in the output signals of the acceleration sensors 11a, 21a, 11b, and 21b are detected, and each of the first, second, third, and fourth trigger components 18a, 28a, 18b, and 28b responds to one of the detected leading portions.

The air-bag devices may be replaced by other safety devices such as vehicle safety-belt pretensioners (tighteners).

Fourth Embodiment

Figure 16:
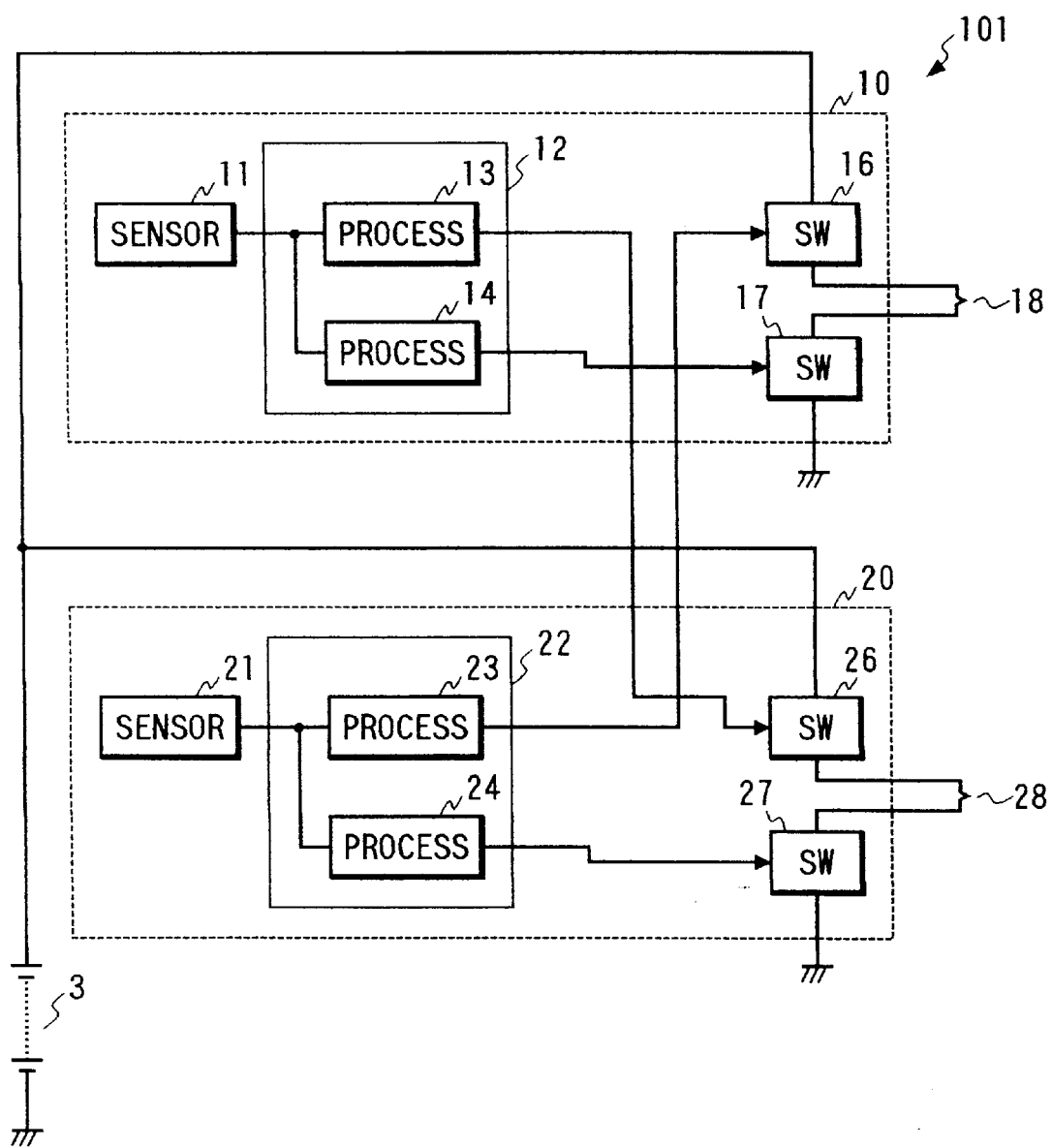
FIG. 16 is a block diagram of a triggering device according to a fourth embodiment of this invention.

With reference to FIG. 16, a triggering device 101 operates on air-bag devices (not shown) provided at right-hand and left-hand sides of an automotive vehicle respectively. The air-bag devices are located at, for example, right-hand and left-hand doors of the automotive vehicle respectively.

The triggering device 101 activates at least one of the air-bag devices when a side of the automotive vehicle collides with an object.

The triggering device 101 includes a first main section 10, a second main section 20, a vehicle battery 3, a first trigger component 18, and a second trigger component 28. Each of the first and second main sections 10 and 20 detects the deceleration (or the acceleration) of the automotive vehicle, and generates a signal representing the detected deceleration. Each of the first and second main sections 10 and 20 processes the deceleration signal, and outputs a signal depending on the result of the processing of the deceleration signal. The first and second trigger components 18 and 28 follow the first and second main sections 10 and 20 respectively. The first and second trigger components 18 and 28 are of the electrically-powered type. The first and second trigger components 18 and 28 serve to activate the air-bag devices respectively. The first trigger component 18 is controlled by the output signal of the first main section 10. The second trigger component 28 is controlled by the output signal of the second main section 20. The vehicle battery 3 is connected to the first and second main sections 10 and 20. The vehicle battery 3 electrically powers the first and second main sections 10 and 20.

The first main section 10 of the triggering device 101 includes an acceleration sensor 11, a signal processor 12, and switches 16 and 17. The acceleration sensor 11 detects deceleration (or acceleration) of the body of the automotive vehicle, and outputs a detection signal representative thereof. The signal processor 12 follows the acceleration sensor 11. The signal processor 12 integrates and processes the detection signal outputted from the acceleration sensor 11. The control terminal of the switch 17 follows the signal processor 12. The switch 16, the first trigger component 18, and the switch 17 are connected in series with the vehicle battery 3. The first trigger component 18 is energized in response to the result of AND operation between the switches 16 and 17.

The second main section 20 of the triggering device 101 includes an acceleration sensor 21, a signal processor 22, and switches 26 and 27. The acceleration sensor 21 detects deceleration (or acceleration) of the body of the automotive vehicle, and outputs a detection signal representative thereof. The signal processor 22 follows the acceleration sensor 21. The signal processor 22 integrates and processes the detection signal outputted from the acceleration sensor 21. The control terminal of the switch 26 follows the signal processor 12 in the first main section 10. The control terminal of the switch 27 follows the signal processor 22. The switch 26, the second trigger component 28, and the switch 27 are connected in series with the vehicle battery 3. The second trigger component 28 is energized in response to the result of AND operation between the switches 26 and 27.

The acceleration sensors 11 and 21 are disposed in inner spaces within the right-hand and left-hand doors respectively. Alternatively, the acceleration sensors 11 and 21 may be fixedly located at positions near the right-hand and left-hand doors respectively. The acceleration sensor 11 outputs a positive detection signal upon a collision between the right-hand side of the automotive vehicle and an object. The acceleration sensor 11 outputs a negative detection signal upon a collision between the left-hand side of the automotive vehicle and an object. The acceleration sensor 21 outputs a negative detection signal upon a collision between the right-hand side of the automotive vehicle and an object. The acceleration sensor 21 outputs a positive detection signal upon a collision between the left-hand side of the automotive vehicle and an object.

The signal processor 12 includes first and second sub signal processors 13 and 14 using different threshold values (corresponding to processing levels) for crash judgment or collision decision respectively. The first and second sub signal processors 13 and 14 receive the detection signal from the acceleration sensor 11. The first sub signal processor 13 is followed by the control terminal of the switch 26. The second sub signal processor 14 is followed by the control terminal of the switch 17. Each of the first and second sub signal processors 13 and 14 includes a combination of an integrating circuit and a comparator. The first sub signal processor 13 integrates the negative detection signal outputted from the acceleration sensor 11, and outputs a high-level signal when the resultant integration value reaches one of given threshold values V1 and V3. The second sub signal processor 14 integrates the positive detection signal outputted from the acceleration sensor 11, and outputs a high-level signal when the resultant integration value reaches one of given threshold values V2 and V4.

The signal processor 22 includes first and second sub signal processors 23 and 24 using different threshold values (corresponding to processing levels) for crash judgment or collision decision respectively. The first and second sub signal processors 23 and 24 receive the detection signal from the acceleration sensor 21. The first sub signal processor 23 is followed by the control terminal of the switch 16. The second sub signal processor 24 is followed by the control terminal of the switch 27. Each of the first and second sub signal processors 23 and 24 includes a combination of an integrating circuit and a comparator. The first sub signal processor 23 integrates the negative detection signal outputted from the acceleration sensor 21, and outputs a high-level signal when the resultant integration value reaches one of the given threshold values V1 and V3. The second sub signal processor 24 integrates the positive detection signal outputted from the acceleration sensor 21, and outputs a high-level signal when the resultant integration value reaches one of the given threshold values V2 and V4.

The absolute values of the given threshold values V1 and V3 used in the sub signal processors 13 and 23 are smaller than the absolute values of the given threshold values V2 and V4 used in the sub signal processors 14 and 24.

The triggering device 101 operates as follows. It is now assumed that the right-hand side of the automotive vehicle collides with an object. The acceleration sensors 11 and 12 detect deceleration (or acceleration) of the automotive vehicle which is caused by the collision. In this case, the acceleration sensor 11 which is located at the right-hand side of the automotive vehicle outputs a positive detection signal with a large amplitude such as shown in the portion (a) of FIG. 17. On the other hand, the acceleration sensor 21 which is located at the left-hand side of the automotive vehicle outputs a negative detection signal with a small amplitude such as shown in the portion (c) of FIG. 17.

The positive detection signal outputted from the acceleration sensor 11 is integrated and processed by the sub signal processor 14 but is not integrated and processed by the sub signal processor 13. Accordingly, the output signal of the sub signal processor 13 remains in a low-level state as shown in the portion (e) of FIG. 17. On the other hand, the sub signal processor 14 generates an effective integration-resultant signal which varies as shown in the portion (b) of FIG. 17.

The negative detection signal outputted from the acceleration sensor 21 is integrated and processed by the sub signal processor 23 but is not integrated and processed by the sub signal processor 24. Accordingly, the output signal of the sub signal processor 24 remains in a low-level state as shown in the portion (h) of FIG. 17. On the other hand, the sub signal processor 23 generates an effective integration-resultant signal which varies as shown in the portion (d) of FIG. 17.

The integration-resultant signal in the sub signal processor 14 reaches the given threshold value V2 at a moment t2 as shown in the portion (b) of FIG. 17. At the moment t2, the sub signal processor 14 starts to output a high-level signal as shown in the portion (f) of FIG. 17. As shown in the portion (j) of FIG. 17, the switch 17 assumes an ON state in response to the high-level signal outputted from the sub signal processor 14.

The integration-resultant signal in the sub signal processor 23 reaches the given threshold value V3 at a moment t3 as shown in the portion (d) of FIG. 17. The moment t3 precedes the moment t2. At the moment t3, the sub signal processor 23 starts to output a high-level signal as shown in the portion (g) of FIG. 17. As shown in the portion (i) of FIG. 17, the switch 16 assumes an ON state in response to the high-level signal outputted from the sub signal processor 23.

In this way, both the switches 16 and 17 assume the ON states upon the collision of the right-hand side of the automotive vehicle with the object. Thus, as shown in the portion (k) of FIG. 7, at the moment t2, the first trigger component 18 is energized and is changed to an ON state so that the air-bag device at the right-hand side of the automotive vehicle is activated.

As previously described, the output signal of the sub signal processor 13 remains in the low-level state (see the portion (e) of FIG. 17). As shown in the portion (l) of FIG. 17, the switch 26 is kept in an OFF state by the low-level output signal of the sub signal processor 13. As previously described, the output signal of the sub signal processor 24 remains in the low-level state (see the portion (h) of FIG. 17). As shown in the portion (m) of FIG. 17, the switch 27 is kept in an OFF state by the low-level output signal of the sub signal processor 24.

In this way, both the switches 26 and 27 remain in the OFF states upon the collision of the right-hand side of the automotive vehicle with the object. Thus, the second trigger component 28 continues to be in an OFF state as shown in the portion (n) of FIG. 17 so that the air-bag device at the left-hand side of the automotive vehicle is not activated.

It is now assumed that the left-hand side of the automotive vehicle collides with an object. The acceleration sensors 11 and 12 detect deceleration (or acceleration) of the automotive vehicle which is caused by the collision. In this case, the acceleration sensor 11 which is located at the right-hand side of the automotive vehicle outputs a negative detection signal with a small amplitude such as shown in the portion (a) of FIG. 18. On the other hand, the acceleration sensor 21 which is located at the left-hand side of the automotive vehicle outputs a positive detection signal with a large amplitude such as shown in the portion (c) of FIG. 18.

The negative detection signal outputted from the acceleration sensor 11 is integrated and processed by the sub signal processor 13 but is not integrated and processed by the sub signal processor 14. Accordingly, the output signal of the sub signal processor 14 remains in a low-level state as shown in the portion (f) of FIG. 18. On the other hand, the sub signal processor 13 generates an effective integration-resultant signal which varies as shown in the portion (b) of FIG. 18.

The positive detection signal outputted from the acceleration sensor 21 is integrated and processed by the sub signal processor 24 but is not integrated and processed by the sub signal processor 23. Accordingly, the output signal of the sub signal processor 23 remains in a low-level state as shown in the portion (g) of FIG. 18. On the other hand, the sub signal processor 24 generates an effective integration-resultant signal which varies as shown in the portion (d) of FIG. 18.

The integration-resultant signal in the sub signal processor 13 reaches the given threshold value V1 at a moment t1 as shown in the portion (b) of FIG. 18. At the moment t1, the sub signal processor 13 starts to output a high-level signal as shown in the portion (e) of FIG. 18. As shown in the portion (l) of FIG. 18, the switch 26 assumes an ON state in response to the high-level signal outputted from the sub signal processor 13.

The integration-resultant signal in the sub signal processor 24 reaches the given threshold value V4 at a moment t4 as shown in the portion (d) of FIG. 18. The moment t4 follows the moment t1. At the moment t4, the sub signal processor 24 starts to output a high-level signal as shown in the portion (h) of FIG. 18. As shown in the portion (m) of FIG. 18, the switch 27 assumes an ON state in response to the high-level signal outputted from the sub signal processor 24.

In this way, both the switches 26 and 27 assume the ON states upon the collision of the left-hand side of the automotive vehicle with the object. Thus, as shown in the portion (n) of FIG. 18, at the moment t4, the second trigger component 28 is energized and is changed to an ON state so that the air-bag device at the left-hand side of the automotive vehicle is activated.

As previously described, the output signal of the sub signal processor 14 remains in the low-level state (see the portion (f) of FIG. 18). As shown in the portion (j) of FIG. 18, the switch 17 is kept in an OFF state by the low-level output signal of the sub signal processor 14. As previously described, the output signal of the sub signal processor 23 remains in the low-level state (see the portion (g) of FIG. 18). As shown in the portion (i) of FIG. 18, the switch 16 is kept in an OFF state by the low-level output signal of the sub signal processor 23.

In this way, both the switches 16 and 17 remain in the OFF states upon the collision of the left-hand side of the automotive vehicle with the object. Thus, the first trigger component 18 continues to be in an OFF state as shown in the portion (k) of FIG. 18 so that the air-bag device at the right-hand side of the automotive vehicle is not activated.

As understood from the previous description, the triggering device 101 can active only the air-bag device at the side of the automotive vehicle which undergoes a collision. Since each of the first and second trigger components 18 and 28 responds to both the output signals of the acceleration sensors 11 and 21, the acceleration-responsive control of the first and second trigger components 18 and 28 is provided with a redundancy. This design can prevent the air-bag devices from being activated by causes other than collisions.

There are the two acceleration sensors 11 and 21 and also the two trigger components 18 and 28. This design can implement a miniature structure and a low cost of the triggering device 101.

The acceleration sensor 11 may be modified to output a negative detection signal upon a collision between the right-hand side of the automotive vehicle and an object, and to output a positive detection signal upon a collision between the left-hand side of the automotive vehicle and an object. In this case, the positive detection signal outputted from the acceleration sensor 11 is effectively processed by the sub signal processor 13. On the other hand, the negative detection signal outputted from the acceleration sensor 11 is effectively processed by the sub signal processor 14.

The acceleration sensor 21 may be modified to output a positive detection signal upon a collision between the right-hand side of the automotive vehicle and an object, and to output a negative detection signal upon a collision between the left-hand side of the automotive vehicle and an object. In this case, the positive detection signal outputted from the acceleration sensor 21 is effectively processed by the sub signal processor 23. On the other hand, the negative detection signal outputted from the acceleration sensor 21 is effectively processed by the sub signal processor 24.

Each of the first and second trigger components 18 and 28 may respond to the output signals of three or more acceleration sensors. The triggering device 101 may be modified to operate on three or more air-bag devices. The triggering device 101 may be applied to air-bag devices which are designed for a frontal crash or an inclined crash.

The triggering device 101 may be additionally provided with a fail-safe function which compensates for the occurrence of a malfunction of one of the acceleration sensors 11 and 21. In an example of the fail-safe function, leading portions of collision-responsive changes in the output signals of the acceleration sensors 11 and 21 are detected, and each of the first and second trigger components 18 and 28 responds to one of the detected leading portions.

The air-bag devices may be replaced by other safety devices such as vehicle safety-belt pretensioners (tighteners).

Fifth Embodiment

Figure 19:
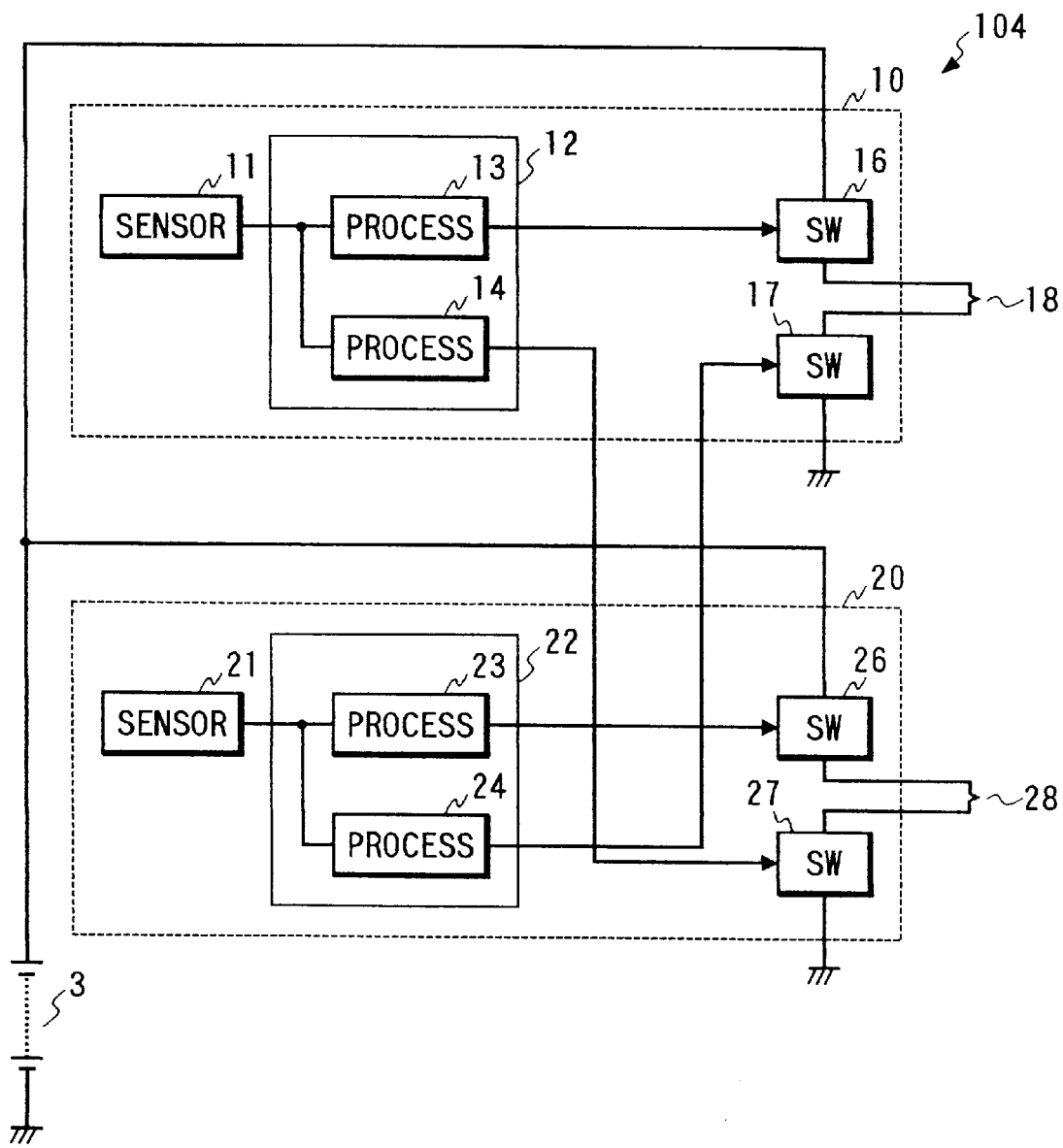
FIG. 19 is a block diagram of a triggering device according to a fifth embodiment of this invention.

FIG. 19 shows a triggering device 104 according to a fifth embodiment of this invention. The triggering device 104 is similar to the triggering device 101 of FIG. 1 except for design changes indicated hereinafter. In the triggering device 101, a sub signal processor 13 is followed by the control terminal of a switch 26, and a sub signal processor 14 is followed by the control terminal of a switch 17. Further, a sub signal processor 23 is followed by the control terminal of a switch 16, and a sub signal processor 24 is followed by the control terminal of a switch 27.

Acceleration sensors 11 and 21 output detection signals void of polarities. Each of the sub signal processors 13 and 14 includes a combination of an integrating circuit and a comparator. Each of the sub signal processors 13 and 14 integrates the detection signal outputted from the acceleration sensor 11, and outputs a high-level signal when the resultant integration value reaches a given threshold value. Each of the sub signal processors 23 and 24 integrates the detection signal outputted from the acceleration sensor 21, and outputs a high-level signal when the resultant integration value reaches a given threshold value.

The given threshold value used by the sub signal processor 13 is smaller than the given threshold value used by the sub signal processor 14. The given threshold value used by the sub signal processor 23 is smaller than the given threshold value used by the sub signal processor 24.

It is preferable that the acceleration sensors 11 and 21 and also air-bag devices are located at a same side of an automotive vehicle.

Each of first and second trigger components 18 and 28 may respond to the output signals of three or more acceleration sensors. The triggering device 104 may be modified to operate on three or more air-bag devices. The triggering device 104 may be applied to air-bag devices which are designed for a frontal crash or an inclined crash.

The triggering device 104 may be additionally provided with a fail-safe function which compensates for the occurrence of a malfunction of one of the acceleration sensors 11 and 21. In an example of the fail-safe function, leading portions of collision-responsive changes in the output signals of the acceleration sensors 11 and 21 are detected, and each of the first and second trigger components 18 and 28 responds to one of the detected leading portions.

The air-bag devices may be replaced by other safety devices such as vehicle safety-belt pretensioners (tighteners).

Sixth Embodiment

Figure 20:
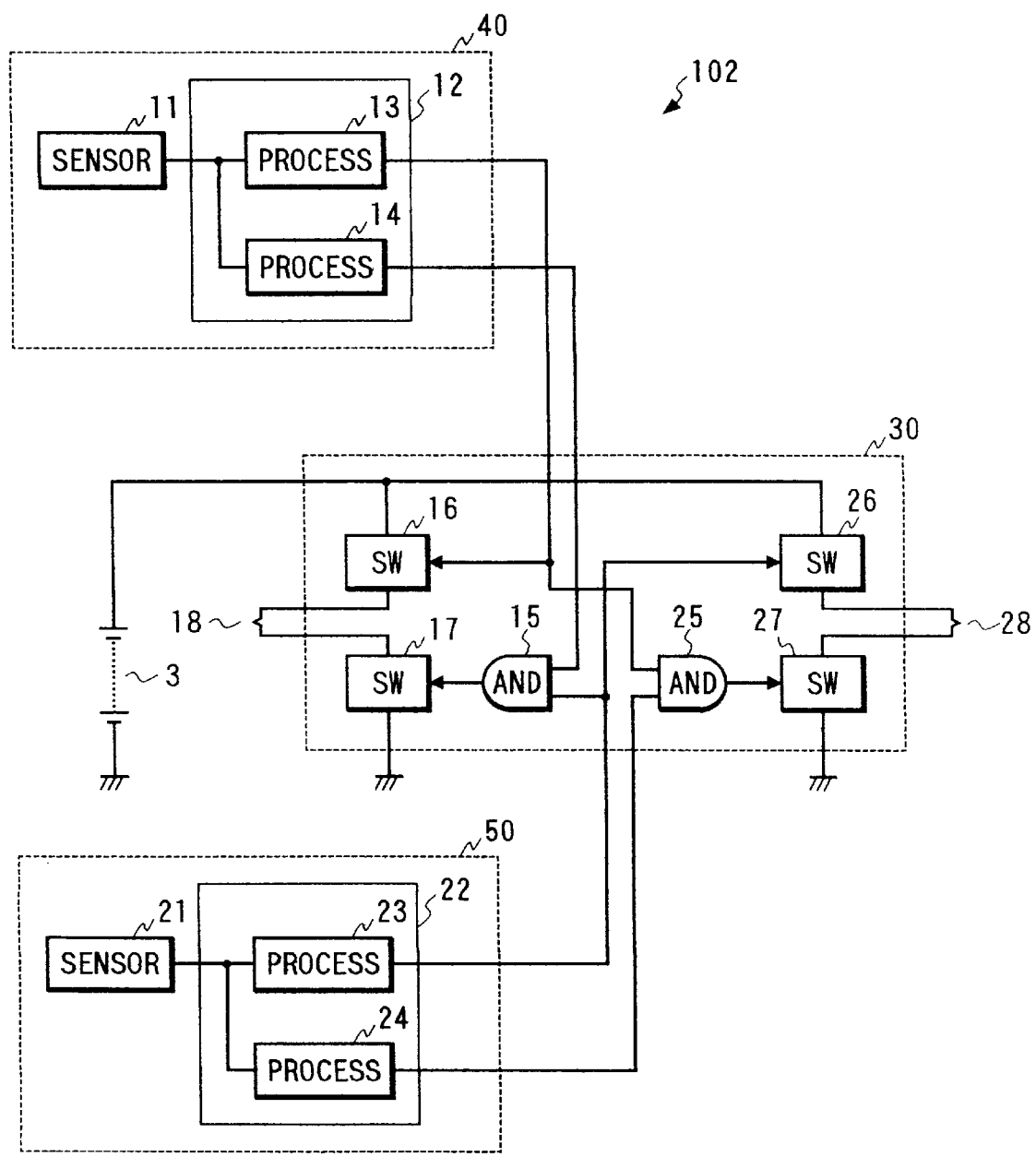
FIG. 20 is a block diagram of a triggering device according to a sixth embodiment of this invention.

With reference to FIG. 20, a triggering device 102 operates on air-bag devices (not shown) provided in an automotive vehicle. The triggering device 102 activates at least one of the air-bag devices when the automotive vehicle collides with an object.

The triggering device 102 includes a judging section 30, a first detecting section 40, a second detecting section 50, a vehicle battery 3, a first trigger component 18, and a second trigger component 28. Each of the first and second detecting sections 40 and 50 detects the deceleration (or the acceleration) of the automotive vehicle, and generates a signal representing the detected deceleration. Each of the first and second detecting sections 40 and 50 processes the deceleration signal, and outputs a signal depending on the result of the processing of the deceleration signal.

The judging section 30 follows the first and second detecting sections 40 and 50. The judging section 30 determines whether or not the air-bag devices should be activated by referring to the output signals of the first and second detecting sections 40 and 50. The first and second trigger components 18 and 28 follow the judging section 30. The first and second trigger components 18 and 28 are of the electrically-powered type. The first and second trigger components 18 and 28 serve to activate the air-bag devices respectively. The first and second trigger components 18 and 28 are controlled by output signals of the judging section 30. The vehicle battery 3 is connected to the judging section 30. The vehicle battery 3 electrically powers the judging section 30.

The first detecting section 40 of the triggering device 102 includes an acceleration sensor 11 and a signal processor 12. The acceleration sensor 11 detects deceleration (or acceleration) of the body of the automotive vehicle, and outputs a detection signal representative thereof. The signal processor 12 follows the acceleration sensor 11. The signal processor 12 integrates and processes the detection signal outputted from the acceleration sensor 11.

The signal processor 12 includes first and second sub signal processors 13 and 14 using different threshold values (corresponding to processing levels) for crash detection respectively. The first and second sub signal processors 13 and 14 receive the detection signal from the acceleration sensor 11. Each of the first and second sub signal processors 13 and 14 includes a combination of an integrating circuit and a comparator. Each of the first and second sub signal processors 13 and 14 integrates the detection signal outputted from the acceleration sensor 11, and outputs a high-level signal when the resultant integration value reaches a given threshold value. The given threshold value used by the first sub signal processor 13 is smaller than the given threshold value used by the second sub signal processor 14.

The second detecting section 50 of the triggering device 102 includes an acceleration sensor 21 and a signal processor 22. The acceleration sensor 21 detects deceleration (or acceleration) of the body of the automotive vehicle, and outputs a detection signal representative thereof. The signal processor 22 follows the acceleration sensor 21. The signal processor 22 integrates and processes the detection signal outputted from the acceleration sensor 21.

The signal processor 22 includes first and second sub signal processors 23 and 24 using different threshold values (corresponding to processing levels) for crash detection respectively. The first and second sub signal processors 23 and 24 receive the detection signal from the acceleration sensor 21. Each of the first and second sub signal processors 23 and 24 includes a combination of an integrating circuit and a comparator. Each of the first and second sub signal processors 23 and 24 integrates the detection signal outputted from the acceleration sensor 21, and outputs a high-level signal when the resultant integration value reaches a given threshold value. The given threshold value used by the first sub signal processor 23 is smaller than the given threshold value used by the second sub signal processor 24.

The judging section 30 of the triggering device 102 includes an AND circuit 15, switches 16 and 17, an AND circuit 25, and switches 26 and 27. A first input terminal of the AND circuit 15 is connected to the output terminal of the sub signal processor 23. A second input terminal of the AND circuit 15 is connected to the output terminal of the sub signal processor 14. The output terminal of the AND circuit 15 is connected to the control terminal of the switch 17. The control terminal of the switch 16 is connected to the output terminal of the sub signal processor 13. The switch 16, the first trigger component 18, and the switch 17 are connected in series with the vehicle battery 3. The first trigger component 18 is energized in response to the result of AND operation between the switches 16 and 17.

A first input terminal of the AND circuit 25 is connected to the output terminal of the sub signal processor 24. A second input terminal of the AND circuit 25 is connected to the output terminal of the sub signal processor 13. The output terminal of the AND circuit 25 is connected to the control terminal of the switch 27. The control terminal of the switch 26 is connected to the output terminal of the sub signal processor 23. The switch 26, the second trigger component 28, and the switch 27 are connected in series with the vehicle battery 3. The second trigger component 28 is energized in response to the result of AND operation between the switches 26 and 27.

Since each of the first and second trigger components 18 and 28 responds to both the output signals of the acceleration sensors 11 and 21, the acceleration-responsive control of the first and second trigger components 18 and 28 is provided with a redundancy. This design can prevent the air-bag devices from being activated by causes other than collisions.

There are the two acceleration sensors 11 and 21 and also the two trigger components 18 and 28. This design can implement a miniature structure and a low cost of the triggering device 102.

The triggering device 102 is basically separated into three hardware portions, that is, the judging section 30 and the first and second detecting sections 40 and 50. According to this design, it is easy to locate the first and second detecting sections 40 and 50 at crash zones to be detected. Furthermore, the judging section 30 can be located at any place in the automotive vehicle. Accordingly, it is possible to increase the degree of freedom in designing.

The air-bag devices may be replaced by other safety devices such as vehicle safety-belt pretensioners (tighteners).

What is claimed is:

1. A triggering device for a safety apparatus, comprising:

first and second deceleration detecting means, located within first and second doors of a vehicle respectively or located at positions near the first and second doors respectively, each for detecting a deceleration;

first signal processing means including first and second signal processors for processing a detection signal of the first deceleration detecting means, and for implementing signal processing with two different processing levels respectively;

second signal processing means including third and fourth signal processors for processing a detection signal of the second deceleration detecting means, and for implementing signal processing with two different processing levels respectively;

a first safety device located at the first door for protecting an occupant in the vehicle;

a second safety device located at the second door for protecting an occupant in the vehicle;

first and second triggering means for triggering the first and second safety devices respectively;

the first signal processor in the first signal processing means processes the detection signal of the first deceleration detecting means, and detects whether or not a result of the process is smaller than a first given level;

the second signal processor in the first signal processing means processes the detection signal of the first deceleration detecting means, and detects whether or not a result of the process is smaller than a second given level greater than the first given level:

the third signal processor in the second signal processing means processes the detection signal of the second deceleration detecting means, and detects whether or not a result of the process is smaller than a third given level; and the fourth signal processor in the second signal processing means processes the detection signal of the second deceleration detecting means, and detects whether or not a result of the process is smaller than a fourth given level greater than the third given level, wherein the first triggering means triggers the first safety device on the basis of results of the signal processing by the first signal processor and the second signal processor in the first signal processing means and the fourth signal processor in the second signal processing means; and the second triggering means triggers the second safety device on the basis of results of the signal processing by the third signal processor and the fourth signal processor in the second signal processing means and the second signal processor in the first signal processing means.

2. A triggering device comprising:

first and second deceleration detecting means, located within first and second doors of a vehicle respectively or located at positions near the first and second doors respectively, each for detecting a deceleration;

first signal processing means including first and second signal processors for processing a detection signal of the first deceleration detecting means, and for implementing signal processing with two different processing levels respectively;

second signal processing means including third and fourth signal processors for processing a detection signal of the second deceleration detecting means, and for implementing signal processing with two different processing levels respectively;

a first safety device located at the first door for protecting an occupant in the vehicle;

a second safety device located at the second door for protecting an occupant in the vehicle;

first and second triggering means for triggering the first and second safety devices respectively;

the first signal processor in the first signal processing means processes the detection signal of the first deceleration detecting means, and detects whether or not a result of the process is smaller than a first given level;

the second signal processor in the first signal processing means processes the detection signal of the first deceleration detecting means, and detects whether or not a result of the process is smaller than a second given level greater than the first given level;

the third signal processor in the second signal processing means processes the detection signal of the second deceleration detecting means, and detects whether or not a result of the process is smaller than a third given level; and the fourth signal processor in the second signal processing means processes the detection signal of the second deceleration detecting means, and detects whether or not a result of the process is smaller than a fourth given level greater than the third given level, wherein the first triggering means triggers the first safety device on the basis of results of the signal processing by the first signal processor and the second signal processor in the first signal processing means and the third signal processor in the second signal processing means; and the second triggering means triggers the second safety device on the basis of results of the signal processing by the third signal processor and the fourth signal processor in the second signal processing means and the first signal processor in the first signal processing means.

* * * * *